US012348977B2

(12) United States Patent
Thyni et al.

(10) Patent No.: US 12,348,977 B2
(45) Date of Patent: Jul. 1, 2025

(54) METHODS PROVIDING GENERATION AND DEPLOYMENT OF NETWORK CONFIGURATIONS AND RELATED MANAGEMENT NODES, COMPUTER PROGRAMS, AND COMPUTER PROGRAM PRODUCTS

(71) Applicant: TELEFONAKTIEBOLAGET LM ERICSSON (PUBL), Stockholm (SE)

(72) Inventors: Tomas Thyni, Järfälla (SE); Mats Forsman, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 297 days.

(21) Appl. No.: 17/909,994

(22) PCT Filed: Mar. 31, 2020

(86) PCT No.: PCT/IB2020/053066
§ 371 (c)(1),
(2) Date: Sep. 8, 2022

(87) PCT Pub. No.: WO2021/198730
PCT Pub. Date: Oct. 7, 2021

(65) Prior Publication Data
US 2023/0362661 A1    Nov. 9, 2023

(51) Int. Cl.
*H04W 16/18*    (2009.01)
*H04W 84/04*    (2009.01)

(52) U.S. Cl.
CPC .......... *H04W 16/18* (2013.01); *H04W 84/042* (2013.01)

(58) Field of Classification Search
None
See application file for complete search history.

(56) References Cited

U.S. PATENT DOCUMENTS

| 6,963,552 | B2 * | 11/2005 | Sabat, Jr. | ............ | H04W 92/045 |
| | | | | | 370/328 |
| 7,761,093 | B2 * | 7/2010 | Sabat, Jr. | .............. | H04W 16/14 |
| | | | | | 455/562.1 |

(Continued)

FOREIGN PATENT DOCUMENTS

| EP | 2334113 A1 | 6/2011 |
| JP | 2019178983 A | 10/2019 |
| KR | 20150073279 A | 7/2015 |

OTHER PUBLICATIONS

3GPP, The Mobile Broadband Standard, 2019, accessed at www.3gpp.org on Nov. 15, 2019.

(Continued)

*Primary Examiner* — Faiyazkhan Ghafoerkhan

(57) ABSTRACT

A method of operating a management node of a wireless mobile/cellular network is discussed, the network including a Radio Access Network (RAN) having a plurality of RAN nodes and a transport network having a plurality of transport nodes. Network data for the wireless mobile/cellular network is collected, wherein the network data include network installation data relating to the pluralities of RAN and transport nodes. A configuration for the wireless mobile/cellular network is automatically provided based on the network data. Responsive to providing the configuration, the configuration is automatically deployed to provide configuration of the pluralities of RAN and transport nodes.

20 Claims, 27 Drawing Sheets

(56) References Cited

U.S. PATENT DOCUMENTS

| | | | | |
|---|---|---|---|---|
| 7,920,858 | B2* | 4/2011 | Sabat, Jr. | H04W 92/12 455/448 |
| 8,160,570 | B2* | 4/2012 | Sabat, Jr. | H04W 92/12 455/448 |
| 8,406,126 | B1* | 3/2013 | Leiba | H04L 1/22 370/222 |
| 8,559,939 | B2* | 10/2013 | Sabat, Jr. | H04W 92/045 455/448 |
| 9,867,052 | B2* | 1/2018 | Sabat, Jr. | H04W 92/12 |
| 10,027,508 | B2* | 7/2018 | Leiba | H04W 40/12 |
| 10,419,092 | B2 | 9/2019 | Srinivasan | |
| 2001/0036163 | A1* | 11/2001 | Sabat, Jr. | H04W 92/045 370/328 |
| 2005/0243785 | A1* | 11/2005 | Sabat, Jr. | H04W 92/045 370/352 |
| 2007/0229378 | A1* | 10/2007 | Clark | H01Q 1/125 343/765 |
| 2009/0061941 | A1* | 3/2009 | Clark | H01Q 1/246 455/562.1 |
| 2010/0255855 | A1* | 10/2010 | Sabat, Jr. | H04W 16/14 455/450 |
| 2011/0143649 | A1* | 6/2011 | Sabat, Jr. | H04W 92/12 455/3.01 |
| 2013/0012195 | A1* | 1/2013 | Sabat, Jr. | H04W 92/12 455/426.1 |
| 2013/0231152 | A1* | 9/2013 | Zimmerman | H01Q 3/005 455/517 |
| 2013/0286869 | A1* | 10/2013 | Woelker | H04W 12/80 370/252 |
| 2013/0294240 | A1* | 11/2013 | Suni | H04L 63/0227 370/235 |
| 2014/0036780 | A1* | 4/2014 | Sabat, Jr. | H04W 92/045 370/328 |
| 2015/0355786 | A1 | 12/2015 | Sabatelli et al. | |
| 2016/0277209 | A1* | 9/2016 | Leiba | H04W 40/12 |
| 2017/0019718 | A1 | 1/2017 | Akgunduz et al. | |
| 2017/0177430 | A1* | 6/2017 | Kazmi | G06F 11/0709 |
| 2018/0317150 | A1* | 11/2018 | Lubenski | H04L 1/1812 |
| 2019/0150003 | A1 | 5/2019 | He et al. | |
| 2019/0302273 | A1 | 10/2019 | Sano et al. | |
| 2020/0007414 | A1* | 1/2020 | Smith | H04L 67/12 |
| 2020/0084202 | A1* | 3/2020 | Smith | H04W 12/08 |
| 2020/0120568 | A1* | 4/2020 | Lubenski | H04W 36/22 |
| 2020/0126265 | A1 | 4/2020 | Gade et al. | |
| 2020/0187015 | A1 | 6/2020 | Li et al. | |
| 2020/0228988 | A1 | 7/2020 | Yang et al. | |
| 2020/0396154 | A1* | 12/2020 | Fiaschi | H04L 45/125 |
| 2021/0219190 | A1* | 7/2021 | Cao | H04W 88/16 |
| 2021/0329416 | A1 | 10/2021 | Li et al. | |
| 2023/0362661 | A1* | 11/2023 | Thyni | H04W 16/18 |

OTHER PUBLICATIONS

Checko A. et al., "Cloud RAN for Mobile Networks—A Technology Overview," in IEEE Communications Surveys & Tutorials, doi: 10.1109/COMST.2014.2355255, vol. 17, No. 1, pp. 405-426, First quarter 2015.

CPRI Specification V7.0 (Oct. 9, 2015), Common Public Radio Interface (CPRI); Interface Specification, 128 pages.

ECPRI Specification V2.0 (May 10, 2019), Common Public Radio Interface; eCPRI Interface Specification, 109 pages.

IEEE Standard for Local and metropolitan area network, Station and Media Access Control Connectivity Discovery, IEEE Std 802.1AB™—2016.

IEEE Std 1914.3™—2018, IEEE Standard for Radio over Ethernet. Encapsulations and Mappings, 3 Park Avenue, New York, NY 10016-5997, USA.

Novaes, "Virtualized C-RAN Orchestration with Docket Kubernetes and OpenAirInterface", arxiv.org, Cornell University Library, 201 OLIN Library Cornell University Ithaca, NY 14853, Jan. 13, 2020 (Jan. 13, 2020).

Oran Alliance, Operator Defined Next Generation RAN Architecture and Interfaces, 2019, www.o-ran.org.

* cited by examiner

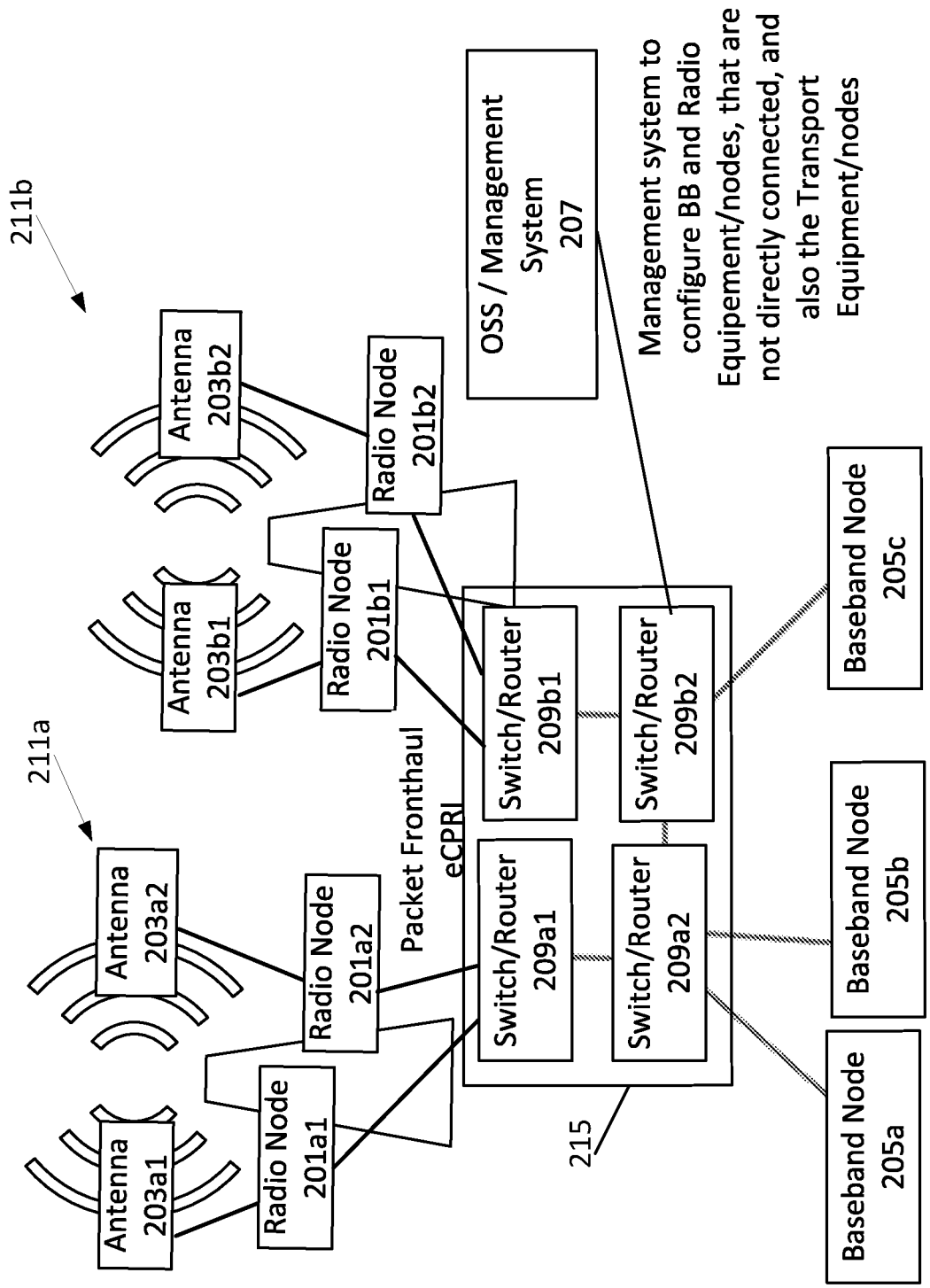

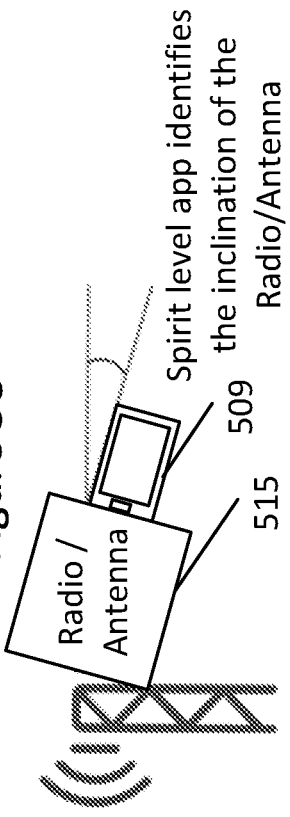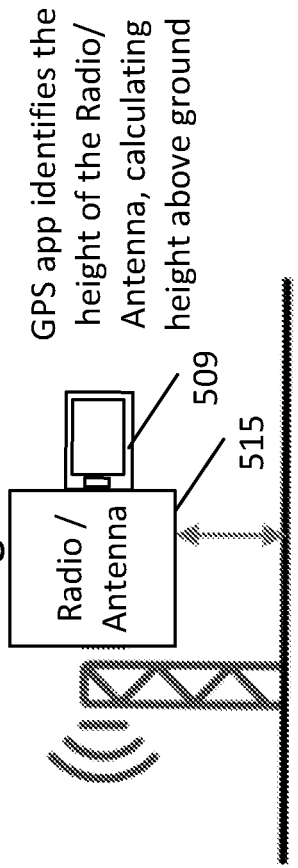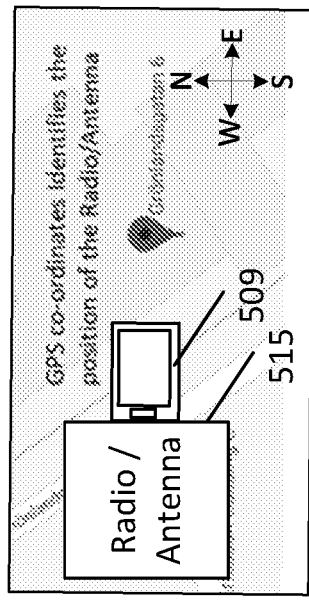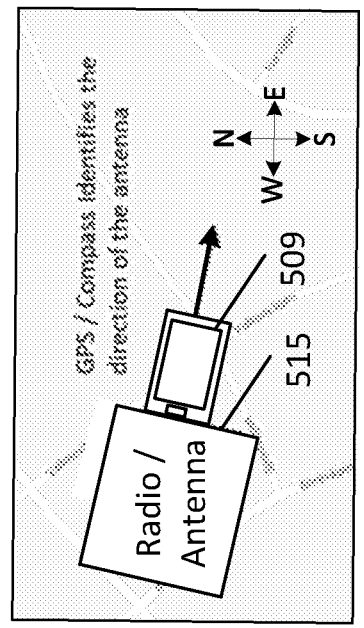

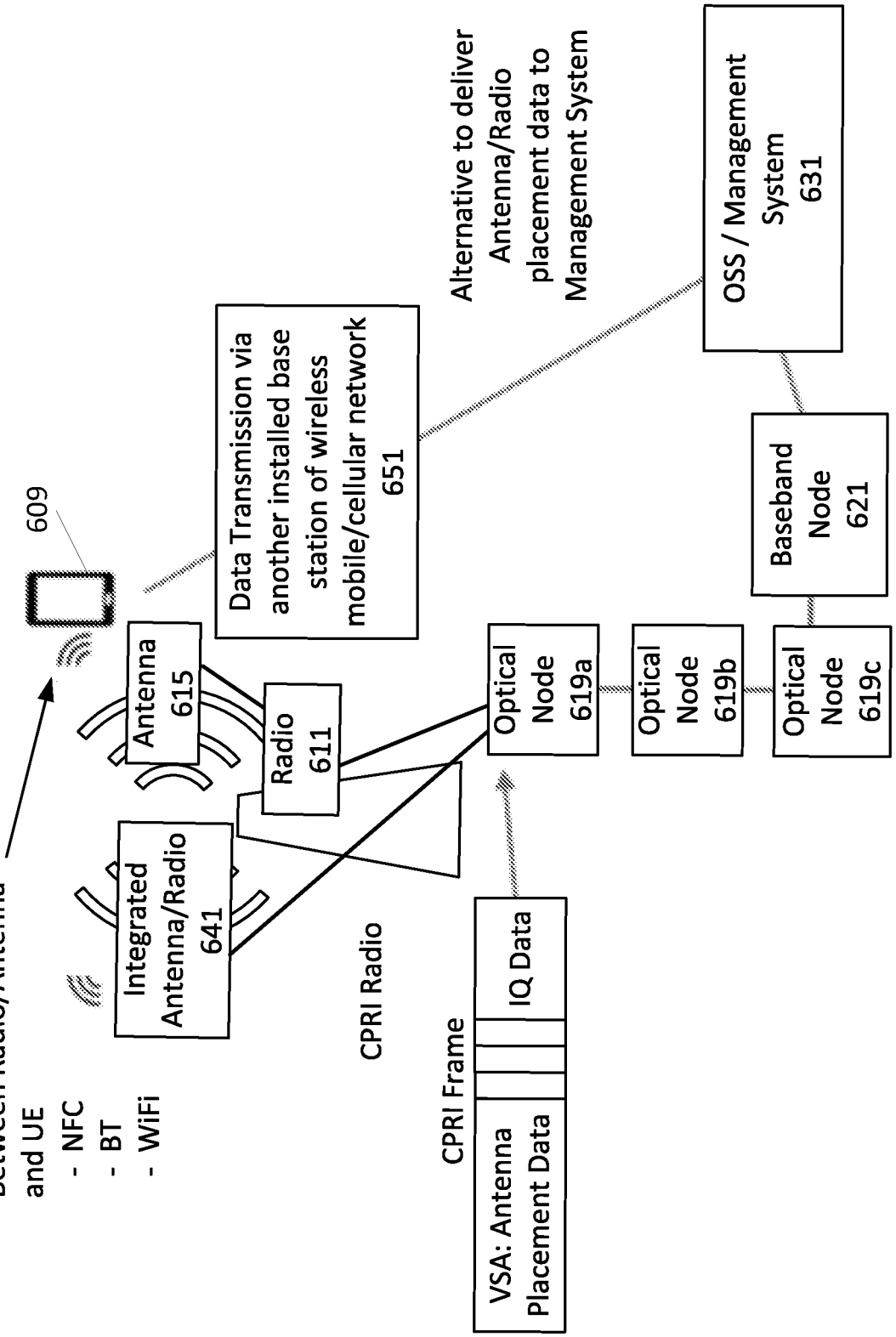

METHODS PROVIDING GENERATION AND DEPLOYMENT OF NETWORK CONFIGURATIONS AND RELATED MANAGEMENT NODES, COMPUTER PROGRAMS, AND COMPUTER PROGRAM PRODUCTS

PRIORITY CLAIM

This application is a national stage of International Application No. PCT/IB2020/053066, filed Mar. 31, 2020, the entire disclosure of which is fully incorporated by reference herein for all purposes.

TECHNICAL FIELD

The present disclosure relates generally to communications, and more particularly to communication methods and related devices and nodes supporting wireless communications.

BACKGROUND

In a roll out of a mobile/cellular communication network there is a planning phase regarding where and how to install the Radio/Antenna equipment/nodes and the Baseband (BB) equipment/nodes (also referred to as Radio Access Network (RAN) compute equipment). Radio placement and antenna directional data and related configuration parameters and settings are planned in advance and prepared in configuration-files in the Operations Support System (OSS)/Management systems for further installation after the physical deployment of Radio and BB equipment. There is also a planning of how and where to deploy the transport equipment between the Radio, BB, and mobile core equipment/nodes, what ports of the Radio/BB equipment/nodes to connect into what ports on the transport equipment, and if applicable, also configuration parameters and settings of transport equipment/nodes.

Traditionally, there has been a direct physical connection between Radio and BB equipment/nodes for a base station 111 on the same or remote site, as shown in FIG. 1A which illustrates a traditional deployment of Antenna 103, Radio node 101, and Baseband node 105 with a Common Public Radio Interface (CPRI) connection (see http://www.cpri.info/spec.html), where these types of connections may be referred to as fronthaul connections (e.g., fronthaul CPRI connections). In FIG. 1A, the OSS/Management system 107 may configure baseband node 105 and the directly connected radio node 101. In FIG. 1B, baseband functionality may be divided between a baseband distributed unit (BB-DU) 105a and a baseband centralized unit (BB-CU) 105b, also referred to as a baseband central unit, both of which may have connectivity with the OSS/Management system 107. A connection between radio node 101 and BB-DU 105a may be provided using a fronthaul CPRI and/or a packet fronthaul Enhanced CPRI (eCPRI) (see http://www.cpri.info/spec.html5), and connection between BB-DU 105a and BB-CU 105b may be provided using a midhaul Higher Layer Split (HLS) (also referred to as an F1 interface).

FIG. 1C is a diagram illustrating a distributed RAN architecture with Baseband (RAN compute) node 105 at base station 111 (also referred to as the Radio Site or RAN node). In FIG. 1C, OSS/Management system 107 may be used to manually configure: Baseband (BB) equipment/node(s) 105; Radio equipment/node(s) 101; and/or Transport (SWR Switch/Router) equipment/node(s) 113.

In a traditional distributed RAN architecture, the Baseband (RAN compute) resources are located at the base station 111 site. A transport network (including transport elements, also referred to as transport nodes) provides communication from every RAN site to the centralized nodes/functions of the Mobile Core network 115.

With 5th Generation (5G) networks, new packet-based connections are defined, such as 3GPP HLS in the Midhaul domain, and Open RAN (ORAN) Lower Layer Split (LLS) in the Fronthaul domain. The CPRI forum has defined a packet variant of CPRI called Enhanced CPRI, and this connection between Radio and BB nodes is defined (referred to as eCPRI) that allows for indirectly connected Radio and BB equipment/nodes with a packet network (including switches/routers) in-between, and this may enable increased flexibility. This type of connection is referred to as Packet Fronthaul. For example, Radio and BB node relations can be changed by parameter reconfiguration at any time after deployment. FIG. 2A illustrates an example of a network with the new 5G architecture providing a centralized architecture with eCPRI connections over a packet transport network 215 (also referred to as a transport network and/or packet network) including switches/routers 209a1, 209a2, 209b1, and 209b2.

As shown in FIG. 2A, each of antennas 203a1 and 203a2 of base station 211a is coupled with a respective one of radio nodes 201a1 and 201a2, and each of antennas 203b1 and 203b2 of base station 211b is coupled with a respective one of radio nodes 201b1 and 201b2. Moreover, radio node 201a1 of base station 211a may be coupled with baseband node 205a through switches/routers 209a1 and 209a2, radio node 201a2 may be coupled with baseband node 205b through switches/routers 209a1 and 209a2, and radio nodes 201b1 and 201b2 may be coupled with baseband node 205c through switches/routers 209b1 and 209b2. OSS/Management System 207 may thus configure baseband and radio nodes that are not directly connected, and OSS/Management System 207 may also configure transport nodes (e.g., switches/routers of the packet transport network).

FIG. 2B is a diagram illustrating another deployment example of a Centralized RAN architecture with Radio-Baseband connections over a packet transport network. In FIG. 2B, OSS/Management System 207 may be used to manually configure: Baseband (BB) equipment/nodes 205a, 205b, and 205c; Radio equipment/nodes 201a1, 201a2, 201b1, and/or 201b2; and Transport (SWR Switch/Router) equipment/nodes 209a1, 209a2, 209b1, and 209b2.

With 5G networks, new packet-based connections between Radio and Baseband are defined, and these packet-based connections may allow for a packet network in-between Radio and Baseband equipment/nodes. This may enable changes/increases in flexibility. Radio and Baseband relations can be changed by parameter reconfiguration at any time after deployment. FIG. 2B is an example of a network with the new 5G architecture.

The work effort in the planning phase of a mobile network rollout may be large and may drive Operational Expenditures (OPEX). With the introduction of 5G with a tighter grid (for example, reduced Inter Site Distances (ISDs), e.g., using small cells), there may be even more planning work. At the installation time, the planned antenna placement is used, but often the planned placement must be adjusted to the real physical environment, and these adjustments may not be documented. There may also be situations when changes/adjustments are made after installation due to changes in the surrounding environment, connectivity network, and/or by adding additional resources (e.g., Radio and/or Baseband resources), resulting in additional planning, re-configuration, and/or documentation effort. There may also be an increased probability for mistakes/errors in planning, physical installation of connections and/or configuration parameters for Radio, BB, and/or Transport equipment/node ports, and this may increase costs for troubleshooting and expensive extra site visits and reconfigurations due to Network Roll Out (NRO) Cost of Sales (CoS) and/or time spent on site for installation.

Accordingly, there continues to exist a need for more efficient network base station installation.

SUMMARY

According to some embodiments of inventive concepts, methods are provided to operate a management node of a wireless mobile/cellular network including a Radio Access Network, RAN, having a plurality of RAN nodes and a transport network having a plurality of transport nodes. Network data for the wireless mobile/cellular network is collected, wherein the network data include network installation data relating to the plurality of RAN nodes of the RAN and the plurality of transport nodes of the transport network. A configuration for the wireless mobile/cellular network is automatically provided based on the network data. Responsive to providing the configuration, the configuration is automatically deployed to provide configuration of the plurality of RAN nodes and the plurality of transport nodes.

According to other embodiments of inventive concepts, a management node is provided for a wireless mobile/cellular network including a Radio Access Network, RAN, having a plurality of RAN nodes and a transport network having a plurality of transport nodes. The management node includes processing circuitry and memory coupled with the processing circuitry. The memory includes instructions that when executed by the processing circuitry causes the management node to: collect network data for the wireless mobile/cellular network, wherein the network data include network installation data relating to the plurality of RAN nodes of the RAN and the plurality of transport nodes of the transport network; automatically provide a configuration for the wireless mobile/cellular network based on the network data; and automatically deploy the configuration to provide configuration of the plurality of RAN nodes and the plurality of transport nodes responsive to providing the configuration.

According to other embodiments of inventive concepts, a management node is provided for a wireless mobile/cellular network including a Radio Access Network, RAN, having a plurality of RAN nodes and a transport network having a plurality of transport nodes. The management node is adapted to: collect network data for the wireless mobile/cellular network, wherein the network data include network installation data relating to the plurality of RAN nodes of the RAN and the plurality of transport nodes of the transport network; automatically provide a configuration for the wireless mobile/cellular network based on the network data; and automatically deploy the configuration to provide configuration of the plurality of RAN nodes and the plurality of transport nodes responsive to providing the configuration.

According to other embodiments of inventive concepts, a computer program includes program code to be executed by processing circuitry of a management node of a wireless mobile/cellular network including a Radio Access Network, RAN, having a plurality of RAN nodes and a transport network having a plurality of transport nodes. Execution of the program code causes the management node to: collect network data for the wireless mobile/cellular network, wherein the network data include network installation data relating to the plurality of RAN nodes of the RAN and the plurality of transport nodes of the transport network; automatically provide a configuration for the wireless mobile/cellular network based on the network data; and automatically deploy the configuration to provide configuration of the plurality of RAN nodes and the plurality of transport nodes responsive to providing the configuration.

According to other embodiments of inventive concepts, a computer program product includes a non-transitory storage medium including program code to be executed by processing circuitry of a management node of a wireless mobile/cellular network including a Radio Access Network, RAN, having a plurality of RAN nodes and a transport network having a plurality of transport nodes. Execution of the program code causes the management node to: collect network data for the wireless mobile/cellular network, wherein the network data include network installation data relating to the plurality of RAN nodes of the RAN and the plurality of transport nodes of the transport network; automatically provide a configuration for the wireless mobile/cellular network based on the network data; and automatically deploy the configuration to provide configuration of the plurality of RAN nodes and the plurality of transport nodes responsive to providing the configuration.

According to some embodiments of inventive concepts, time/effort required to generate and/or deploy network configurations may be reduced, and/or errors in the generation/deployment of the network configurations may be reduced.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 2A and 2B are diagrams illustrating transport and RAN equipment/nodes according to the 5G architecture;

FIGS. 5A, 5B, 5C, and 5D are diagrams illustrating physical installation data that may be obtained by a UE device according to some embodiments of inventive concepts;

FIGS. 6, 7, 8, and 9 are diagrams illustrating transfer of installation data according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1A:
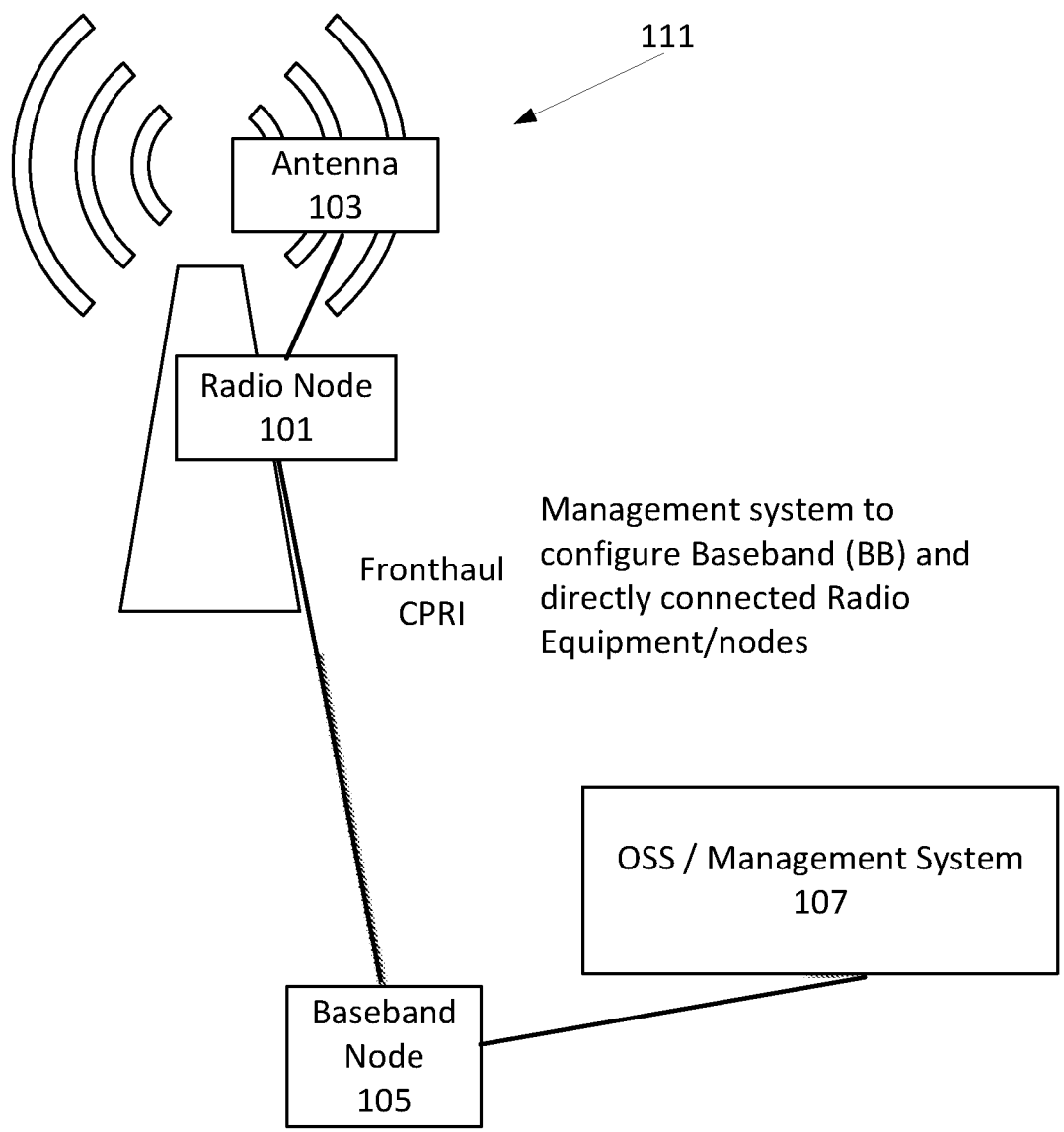
FIGS. 1A, 1B, and 1C are diagrams illustrating deployments of radio node(s), antenna(s), and baseband node(s)
Figure 1B:
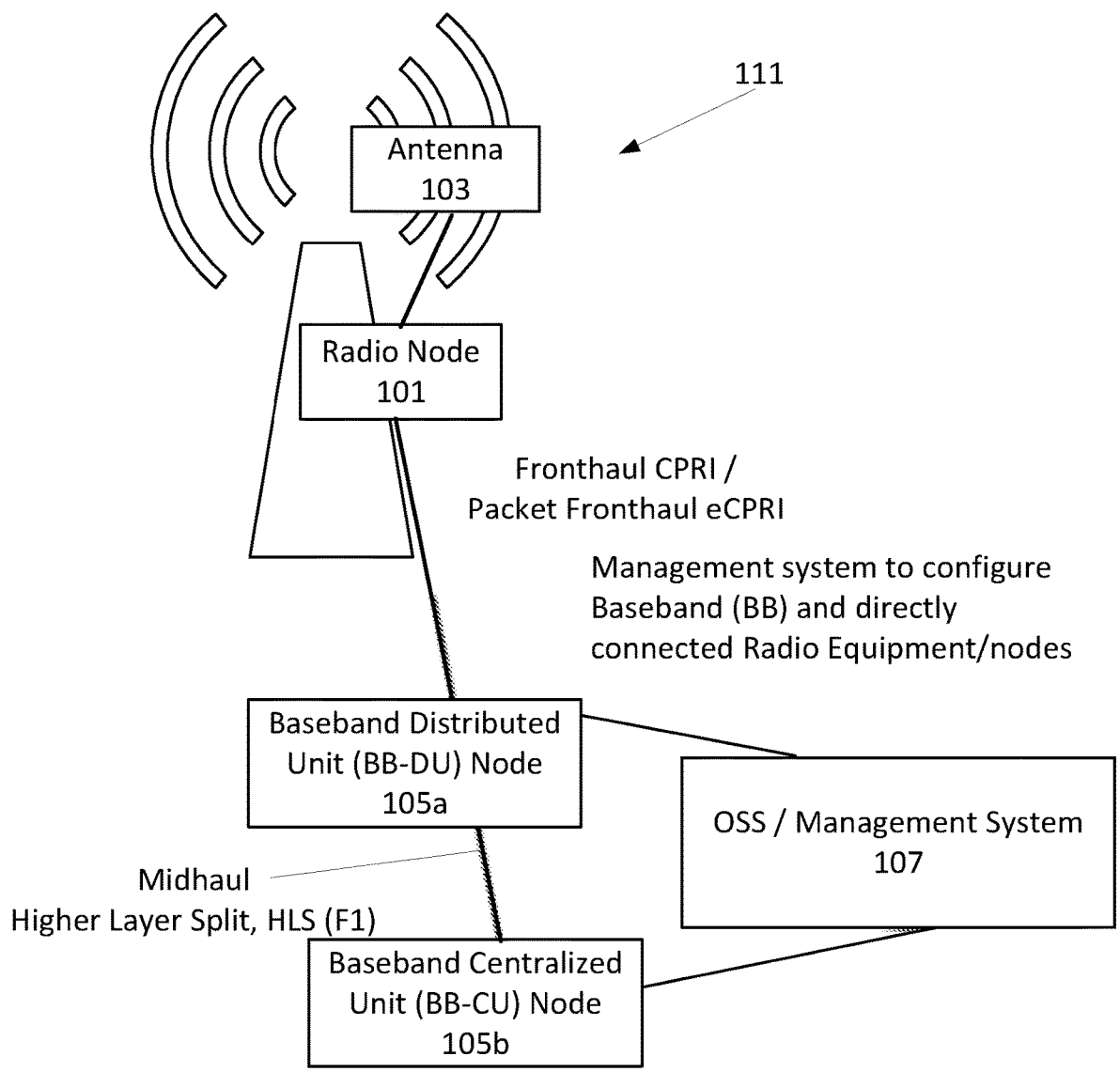
Figure 1C:
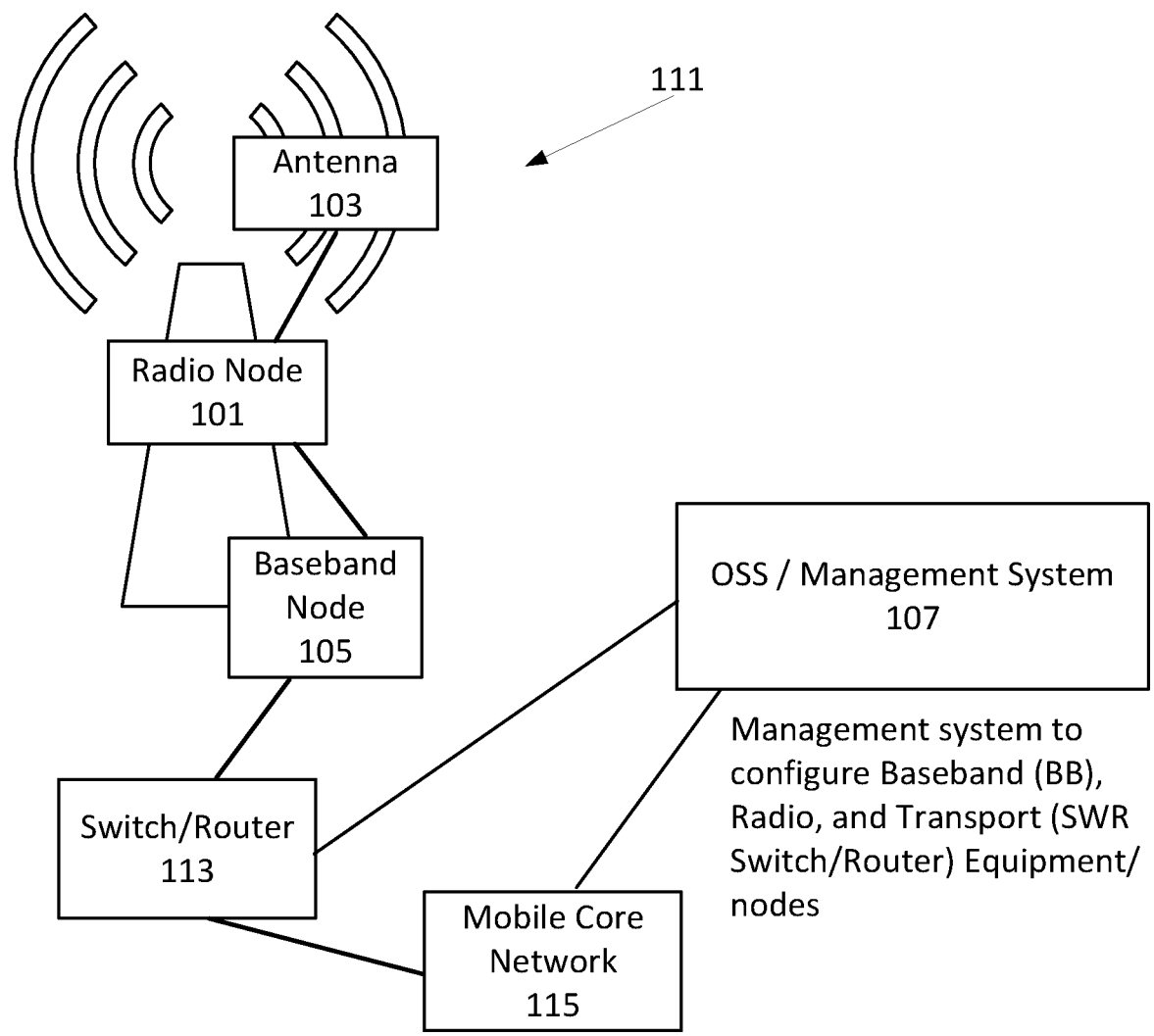
Figure 2B:
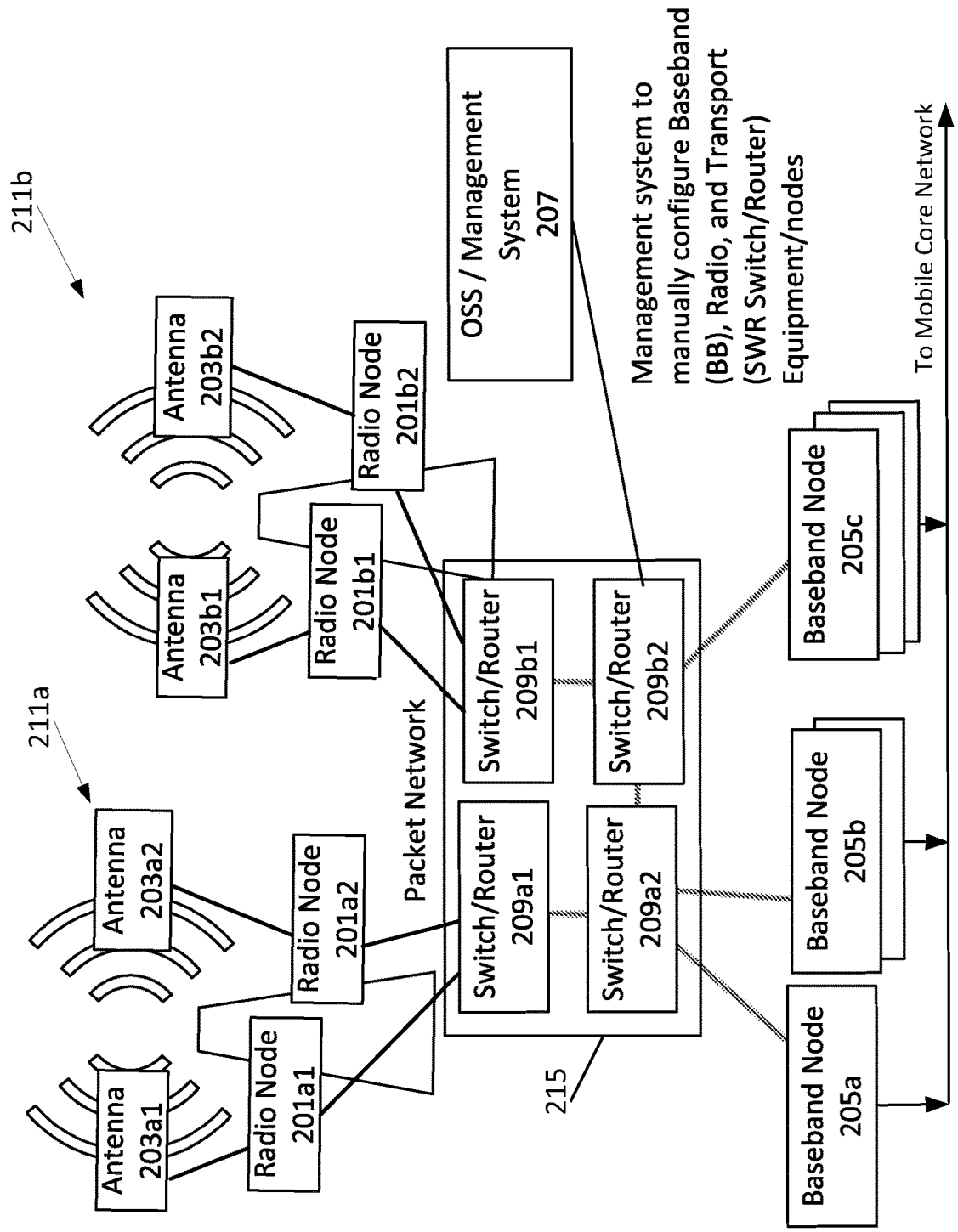
Figure 3A:
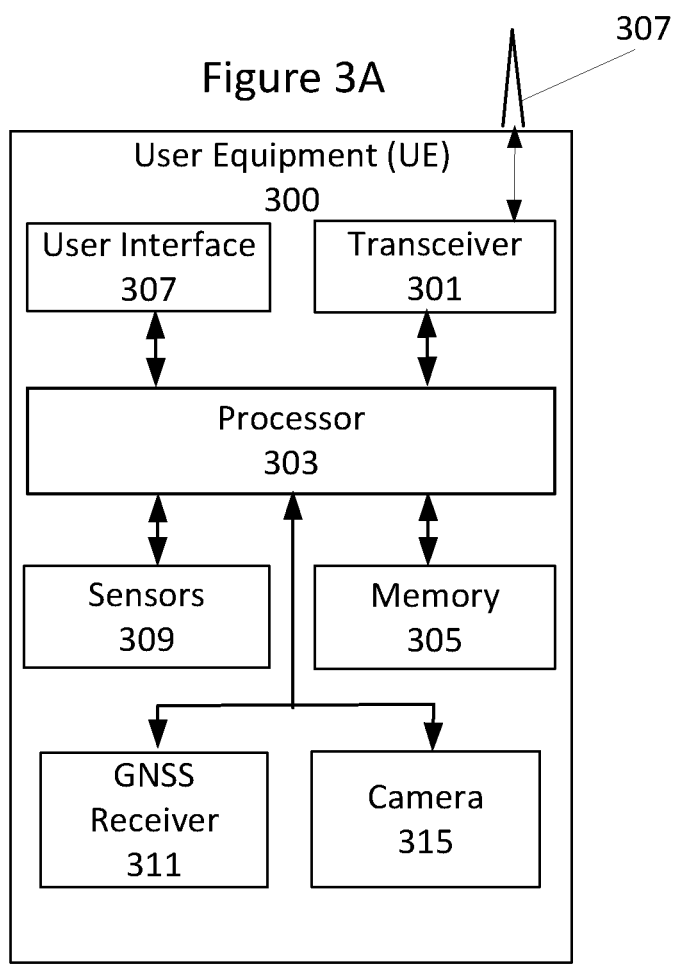
FIG. 3A is a block diagram illustrating a UE device (also referred to as a wireless device) according to some embodiments of inventive concepts.

FIG. 3A is a block diagram illustrating elements of a user equipment (UE) device 300 (also referred to as a mobile terminal, a mobile communication terminal, a wireless device, a wireless communication device, communication device, a wireless terminal, mobile device, a wireless communication terminal, user equipment, UE, a user equipment node/terminal/device, etc.) configured to provide wireless communication according to embodiments of inventive concepts. (UE device 300 may be provided, for example, as discussed below with respect to wireless device 1610 of FIG. 16.) As shown, UE device may include an antenna 307 (e.g., corresponding to antenna 1611 of FIG. 16), and transceiver circuitry 301 (also referred to as a transceiver, e.g., corresponding to RF transceiver circuitry 1622 of FIG. 16) including a transmitter and a receiver configured to provide cellular uplink and downlink radio communications with a base station(s) (e.g., corresponding to network node 1660 of FIG. 16, also referred to as a RAN node) of a radio access network. Transceiver circuitry 301 may also provide short range wireless communication (e.g., WiFi communication, Bluetooth (BT) communication, Near Field Communication (NFC), etc.). UE device may also include processing circuitry 303 (also referred to as a processor, e.g., corresponding to processing circuitry 1620 of FIG. 16) coupled to the transceiver circuitry, and memory circuitry 305 (also referred to as memory, e.g., corresponding to device readable medium 1630 of FIG. 16) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required.

Figure 16:
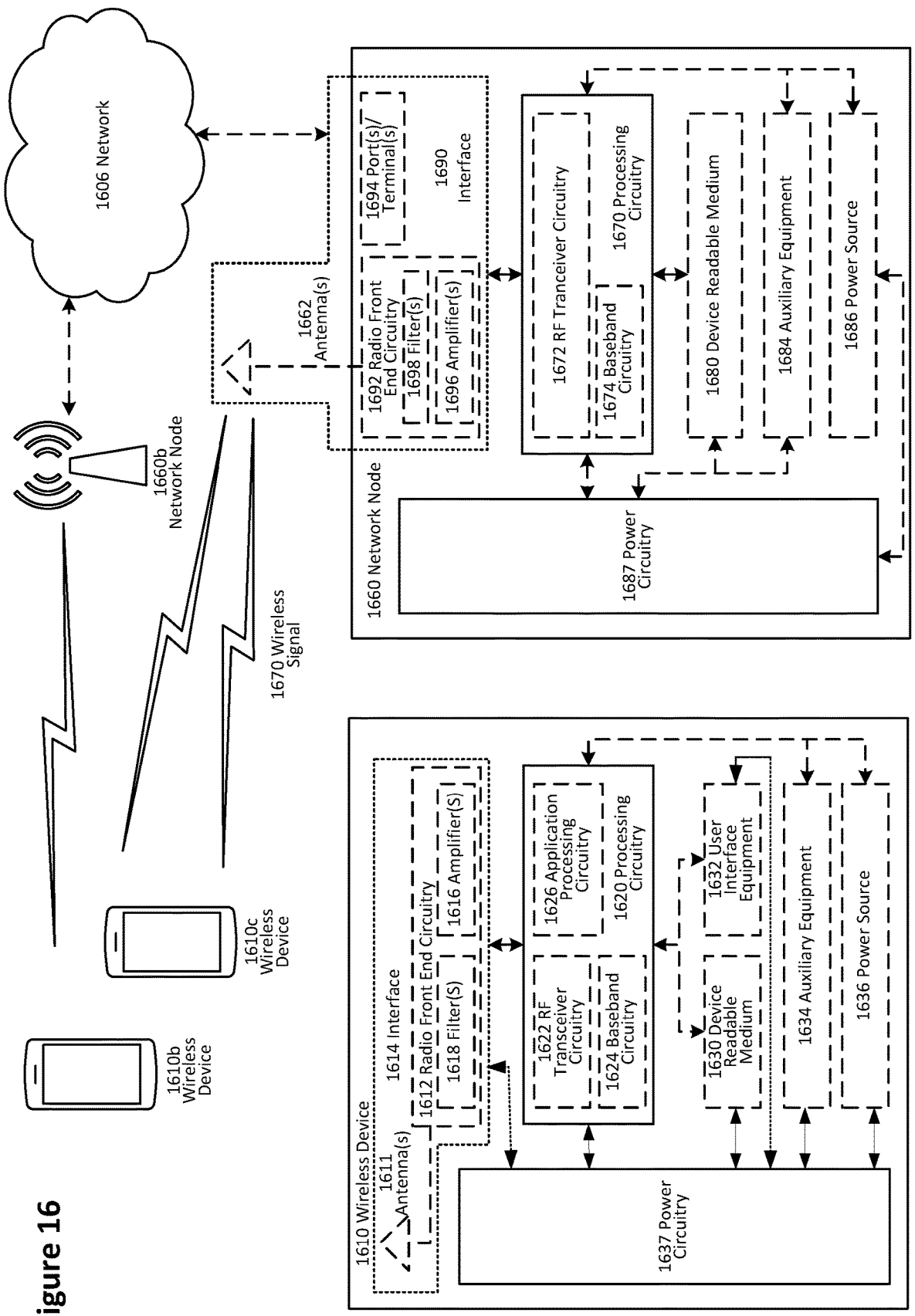
FIG. 16 is a block diagram of a wireless network in accordance with some embodiments.

UE device may also include a user interface 307 (also referred to as an interface; corresponding to interface 1614 of FIG. 16) coupled with processing circuitry 303, sensors 309 (e.g., accelerometers) coupled with processing circuitry 303, a Global Navigation Satellite System (GNSS) receiver 311 (also referred to as a Global Positioning System (GPS) receiver) coupled with processing circuitry 303, and/or a digital camera 315 coupled with processing circuitry 303. Associated apps (also referred to as applications or software applications) may be stored in memory 305 including instructions that allow processing circuitry 303 to process information from sensors 309, GNSS receiver 311, and/or camera 315.

Sensors 309 may include accelerometers having different orientations in UE device 300 configured to detect accelerations in different directions. A level app (sometimes referred to as a spirit level app) in memory 305 may provide instructions allowing processing circuitry 303 to use sensors 309 (e.g., accelerometers) to determine a tilt of an antenna (based on a tilt of the UE device) as discussed below with respect to FIG. 5C. A GNSS receiver app in memory 305 may provide instructions allowing processing circuitry 303 to use GNSS receiver 311 to determine a location, altitude, height, and/or direction of the antenna (based on a location, altitude, height, and/or direction of the UE device) as discussed below with respect to FIGS. 5A, 5B, and 5D. A camera app in memory 305 may provide instructions allowing processing circuitry 303 to obtain an image of a code/codes (e.g., bar codes, Quick Response codes (QR-codes), etc.) that can be used to identify various nodes/ports of a base station.

As discussed herein, operations of UE device may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules (e.g., instructions, apps, etc.) may be stored in memory circuitry 305, and these modules may provide instructions so that when instructions of a module are executed by processing circuitry 303, processing circuitry 303 performs respective operations (e.g., operations discussed below with respect to embodiments relating to UE devices, such as operations discussed with respect to UE device 409 of FIG. 4, UE device 509 of FIG. 5A, FIG. 5B, FIG. 5C, and/or FIG. 5D, and/or UE device 609 of FIG. 6, FIG. 7, FIG. 8, and/or FIG. 9, and/or operations of FIG. 10).

Figure 3B:
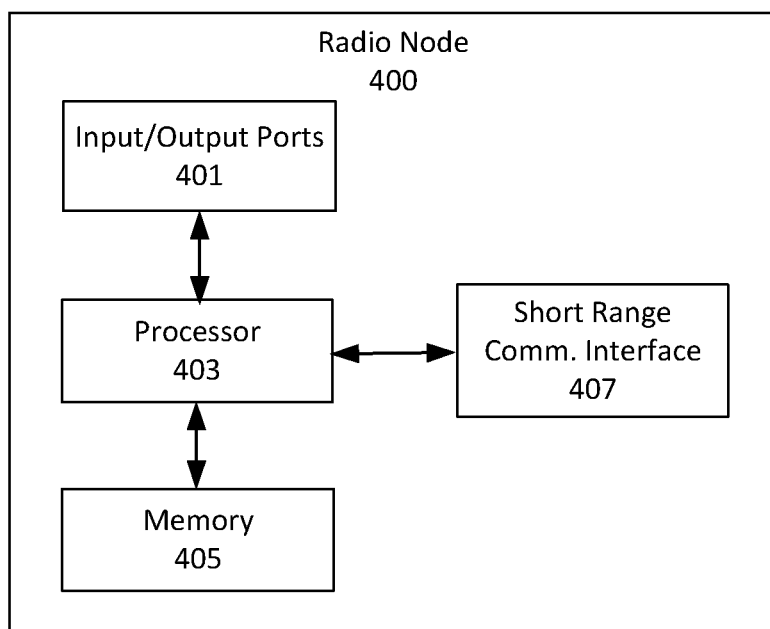
FIG. 3B is a block diagram illustrating a radio node according to some embodiments of inventive concepts.

FIG. 3B is a block diagram illustrating elements of a radio node 400 for a base station (where a base station may also be referred to as a Radio Access Network node, RAN node, network node, eNodeB/eNB, gNodeB/gNB, etc.) of a Radio Access Network (RAN) configured to provide cellular communication according to embodiments of inventive concepts. (A base station may be provided, for example, as discussed below with respect to network node 1660 of FIG. 16.) As shown, the radio node may include input/output ports 401 to provide coupling with other nodes/antennas of the base station and/or network. The input/output ports 401 may include antenna ports to provide coupling with one or more antennas, or antenna ports may be omitted if radio node 400 includes an integrated antenna/antennas. In addition or in an alternative, input/output ports may include transport ports to provide coupling with one or more transport nodes. In addition, radio node 400 may include a short range wireless communication interface 407 (e.g., a WiFi communication interface, a BlueTooth communication interface, etc.). The radio node 400 may also include processing circuitry 403 (also referred to as a processor) coupled to the input/output ports 401, the short range wireless communication interface, and memory circuitry 405 (also referred to as memory). The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required.

As discussed herein, operations of the radio node 400 may be performed by processing circuitry 403, and/or input/output ports 401. For example, processing circuitry 403 may control input/output ports 401 to transmit cellular downlink communications through an antenna over a radio interface to one or more UE devices and/or to receive cellular uplink communications through input/output ports 401 and antennas from one or more UE devices over a radio interface. Similarly, processing circuitry 403 may control input/output ports 401 to transmit/receive communications to/from one or more transport nodes. Processing circuitry 403 may also control short range wireless communication interface to transmit/receive communications to/from the UE device as discussed in greater detail below. Moreover, modules may be stored in memory 405, and these modules may provide instructions so that when instructions of a module are executed by processing circuitry 403, processing circuitry 403 performs respective operations (e.g., operations discussed below with respect to embodiments relating to radio nodes, such as operations discussed with respect to integrated radio/antenna node 415 of FIG. 4, integrated radio/antenna node 515 of FIG. 5A, FIG. 5B, FIG. 5C, and/or FIG. 5D, radio node 611 of FIG. 6, FIG. 7, FIG. 8, and/or FIG. 9, and/or integrated radio/antenna node 641 of FIG. 6, FIG. 7, FIG. 8, and/or FIG. 9, and/or operations of FIG. 11).

Figure 3C:
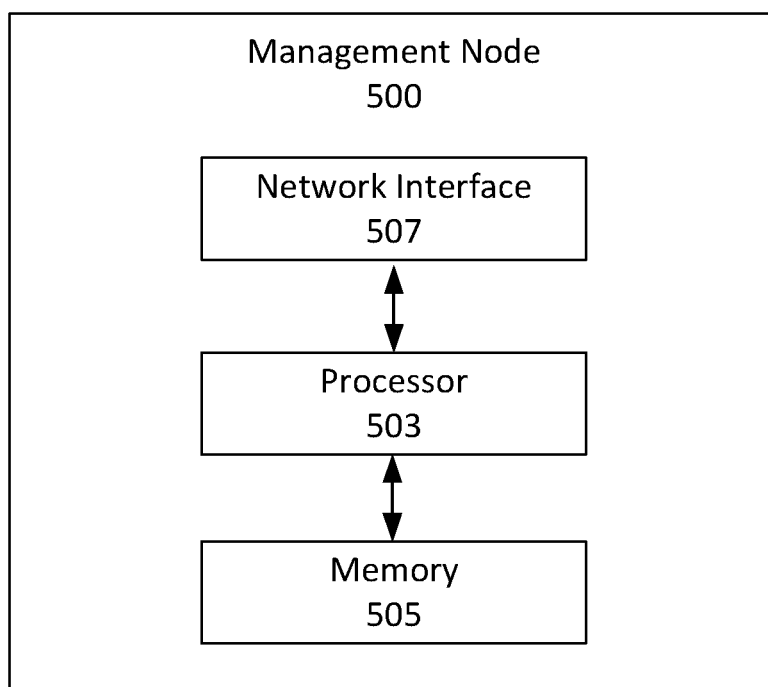
FIG. 3C is a block diagram illustrating a management node according to some embodiments of inventive concepts.

FIG. 3C is a block diagram illustrating elements of a management node 500 (e.g., a node of an OSS/management system) of a communication network configured to provide cellular communication according to embodiments of inventive concepts. As shown, the management node may include network interface circuitry 507 (also referred to as a network interface) configured to provide communications with other nodes of the core network and/or the radio access network (RAN) of the wireless network. The management node may also include processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required.

As discussed herein, operations of the management node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to embodiments relating to management nodes, such as operations discussed with respect to OSS/Management System node 631 of FIG. 6, FIG. 7, FIG. 8, and/or FIG. 9, and/or operations of FIG. 12).

Some embodiments of inventive concepts are based on using a user equipment (UE) device with apps (also referred to as applications) on site that can automatically identify the Radio/Antenna equipment/nodes as such, and/or the position(s) and direction(s) of the Radio/Antenna including its connection(s) to transport equipment/nodes. The UE device can also be used to identify BB and Transport equipment/nodes if they are not already automatically identified via the port connections. In addition, the UE/app can automatically send the information to management node 500 of an OSS/Management system.

Several methods can be used to identify equipment/nodes, connection ports, etc., according to embodiments of inventive concepts. For example, short-range wireless or barcodes/QR-code(s) may be used. Assembled data can automatically be sent from the UE device via wireless network to OSS/management systems or transferred back to Radio/Transport equipment/nodes for further automatic transfer to management systems.

According to some embodiments of inventive concepts, more efficient documentation of a base station installation data may be provided. Some embodiments may reduce the planning and preparation work including documentation of the system and physical position/location of the site equipment (also to produce the configuration data, as discussed in greater detail below). Some embodiments may also reduce/minimize risk of errors from mistakes that may occur during physical installation of equipment and/or mismatches in configuration data between Radio/Antenna, BB, and Transport equipment/nodes, and/or time required for correction of installation errors may be reduced. Some embodiments may also simplify processes to handle changes in the network and may reduce/minimize inconsistency in documentation.

At installation, a UE device is used to identify equipment/node IDs and/or physical installation data, for example, using short-range wireless connection alternatives and/or scanning bar-codes/QR-codes. Wireless alternatives can include NFC (Near Field Communication) which may not require base station equipment to be powered. WiFi and Bluetooth are other alternatives. Such operations are discussed below with respect to operation 1 of FIG. 4.

For a given item of equipment/node, connection/port-IDs and the transport port to which it is connected can also be identified using bar-code/QR-code methods.

Another method is that port/node IDs can be identified directly by the transport equipment/nodes if the Radio/Antenna equipment/nodes have a capability to announce equipment/Port-ID over its transport connection/port to the transport equipment/nodes.

Figure 4:
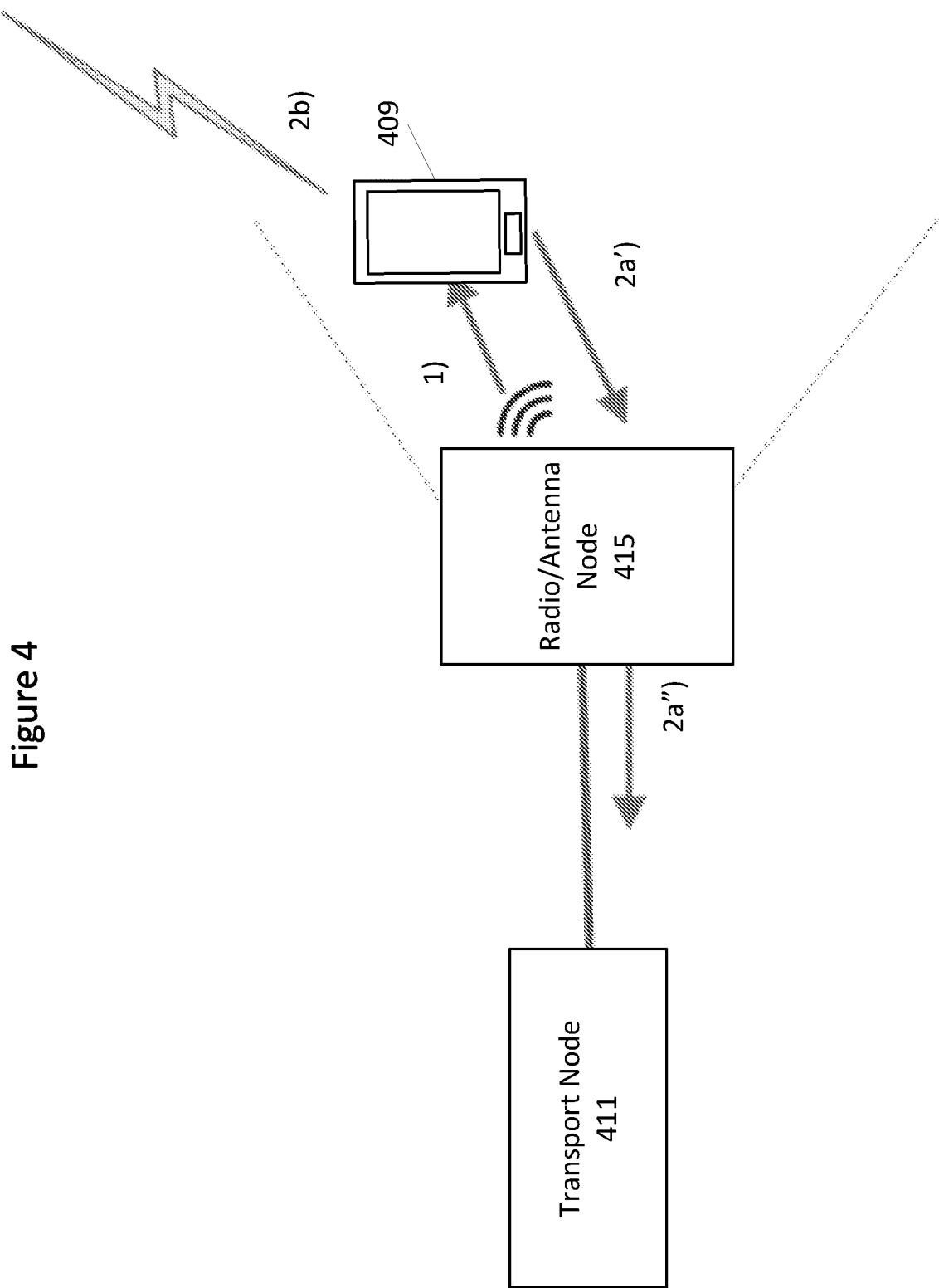
FIG. 4 is a block diagram illustrating operations of a UE device and a radio node exchanging data according to some embodiments of inventive concepts.

The UE may assemble port/node IDs and/or physical installation data (as shown in FIG. 4) and then send all assembled data to the network management system either via the Radio/Transport equipment/node and fixed connection (as discussed with respect to operations 2a' and 2a" of FIG. 4), or via wireless mobile/cellular network (as discussed with respect to operation 2b of FIG. 4).

FIG. 4 illustrates equipment/node identification and exchange of data. In FIG. 4, Radio/Antenna node 415 may be an integrated radio/antenna node installed on a base station, or a separate radio node and antenna that are coupled via a cable and/or port. Transport node 411 may be a packet network router/switch or passive/active optical network node that provides a data path to an OSS/management system node of the mobile/cellular network. At operation 1 of FIG. 4, UE device 409 (provided according to the structure of UE device 300 of FIG. 3A) may obtain information regarding the radio/antenna node. As discussed above, for example, UE device 409 may receive node identifiers IDs for the antenna and/or radio node (which may be separate or integrated) and/or associated baseband node and/or associated transport node, either wirelessly (e.g., using a short range wireless connection such as NFC, WiFi, Bluetooth, etc.) or optically using a camera app to capture an identifying code such as a bar code and/or a QR code provided on the respective antenna, radio node, transport node, and/or baseband node. The UE device may also obtain physical installation data regarding position and/or orientation of the antenna as discussed in greater detail below. UE device 409 may assemble this node ID and/or physical installation data for the radio/antenna node 415 of the base station and transmit this assembled data according to either operation 2a' or operation 2b.

According to embodiments of operation 2a'/2a" of FIG. 4, UE device 409 may transmit the assembled data using a short range wireless communication (e.g., WiFi, Bluetooth, etc.) at operation 2a' through the antenna and/or radio node or the integrated radio/antenna node that includes a short range communication transceiver (shown as radio/antenna node 415 in FIG. 4), and the radio/antenna node 415 may transmit the assembled data at operation 2a" through the transport node to a node of the OSS/management system of the mobile/cellular network. In such embodiments, the assembled data may be transmitted to transport node 411 by including the assembled data as a vendor specific attribute (VSA) in a frame (e.g., a CPRI frame, eCPRI frame, Link Layer Discovery Protocol (LLDP) frame, etc.). According to embodiments of Operation 2b, UE device 409 may transmit the assembled data to a node of the OSS/management system via another network base station that is fully operational using a mobile/cellular network connection/communication.

The UE may also identify additional Radio/Antenna physical installation data that is related to a position (e.g., location, height, etc.) and/or orientation (e.g., direction, vertical tilt or inclination/declination angle, etc.) of the antenna. Additional Radio/Antenna geometrical physical installation data that may be identified is shown in FIGS. 5A, 5B, 5C, and 5D and may include:

- Location (e.g., GNSS/GPS coordinates) of the Radio/Antenna (also referred to as position, e.g., obtained using a Global Navigation Satellite System (GNSS) app and GNSS receiver in the UE) may be determined as shown in FIG. 5A;
- Direction (e.g., compass direction) of the Radio/Antenna (e.g., obtained using a GNSS/Compass app and GNSS receiver in the UE) may be determined as shown in FIG. 5B;
- Tilt of the Radio/Antenna (e.g., provided as an inclination/declination angle obtained using a spirit level app and sensors in the UE) may be determined as shown in FIG. 5C;
- Height of the Radio/Antenna (e.g., obtained using a GNSS app and GNSS receiver that provides altitude of the UE device and ground height at the location that are used together to calculate height above ground) may be determined as shown in FIG. 5D.

As shown in FIGS. 5A, 5B, 5C, and 5D, the UE device may be held/placed against a particular surface of the antenna, and while held/placed against this surface, various sensors/apps in the UE device may determine the antenna position (e.g., based on information from a GNSS app), the antenna direction (e.g., based on information from a GNSS/compass app), the antenna vertical tilt (e.g., provided as an inclination/declination angle relative to horizontal based on information from a level app), and/or the antenna height relative to ground (e.g., based on information from a GNSS app).

According to some embodiments, the UE device may be held by the user physically against the antenna to provide that the position/orientation of the UE device accurately reflects the position (e.g., location, height, etc.) and/or orientation (e.g., direction, tilt, etc.) of the antenna. For example, one end (e.g., a microphone end) of the UE device may be held flush against the antenna with the touch screen facing up. The installation app may provide a prompt (e.g., a text, audio, or video prompt) for the User to hold the UE device against the antenna in the proper position, and the UE device may accept user input (e.g., via the touch screen) to indicate that the UE device is in the proper position. Responsive to receiving this user input (that the UE device is in the proper position), the installation app may use other apps (e.g., a GNSS app, a compass app, a level app, etc.) to determine physical installation data for the antenna (e.g., based on the location, height, direction, tilt, etc. of the UE device). Once the installation app has determined the physical installation data for the antenna, the UE device may provide a notification to the user that the user can move the UE device away from the antenna.

According to some embodiments, the antenna may include a guide to assist in placing the UE device in the proper position when obtaining the physical installation data. For example, the antenna may include markings to show where to place the microphone end of the UE device when obtaining the physical installation data. In addition or in an alternative, the antenna may include a physical structure (e.g., a shaped recess) configured to receive the microphone end of the UE device to force the proper position when obtaining the physical installation data.

If the UE device uses a wireless mobile/cellular network connection/communication to send assembled data as discussed with respect to operation 2b of FIG. 4, the assembled data may be sent using a traditional secure connection to the operator management system.

If the UE device uses a short-range wireless connection to the Radio/Antenna equipment/node 515, the radio/antenna equipment/node 515 will receive all the assembled data (e.g., as discussed with respect to operation 2a' of FIG. 4). When the radio/antenna equipment/node 515 is powered up and connected to a transport node (e.g., a packet network switch) that is activated, then the assembled data can be sent using different methods. Four different methods are discussed below.

In an example of FIG. 6, the Radio node 611 and BB node 621 may be connected using a CPRI connection via an optical network/connection, for example, including optical filters 619a, 619b, and 619c. The assembled data in Radio node 611 may be added into a CPRI frame as a Vendor Specific Attribute (VSA). The VSA may be transparently transported through the optical network/connection to BB node 621 that terminates the CPRI connection and that reads out the assembled data from the VSA field, and the BB node 621 may then transmit the assembled data to a node of OSS/management system 631 for further processing.

FIG. 6 illustrates an embodiment to transfer Radio/Antenna physical installation data and/or identifier data using a CPRI optical network (including optical filters 619a, 619b, and 619c). As shown, a short range wireless connection/communication (e.g., WiFi, BlueTooth, NFC, etc.) between UE device 609 (provided as discussed above with respect to FIG. 3A) and radio node 611 and/or antenna 615 may be used by UE device 609 to obtain identifiers relating to the antenna 615 and/or radio node 611. For example, UE device 609 may use the short range wireless connection/communication to obtain identifier data relating to antenna 615, radio node 611, and/or baseband node 621, for example, including an identifier of radio node 611, an identifier of antenna 615, an identifier of BB node 621 to which radio node 611 is connected, an identifier of a port of radio node 611 to which antenna 615 is connected, an identifier of a port of BB node 621 to which radio node 611 is connected, an identifier of a port of radio node 611 to which BB node is connected, etc. UE device 609 may also obtain physical installation data for antenna 615 (e.g., position and orientation data). With an integrated antenna/radio node 641, a single identifier for the antenna/radio node 641 may be provided (i.e., without separate IDs for antenna and radio node).

UE device 609 may then transmit the assembled data (e.g., including the identifier data and/or the physical installation data) to a node of the OSS/Management System 631. This data may either be transmitted via a short range wireless connection/communication to antenna 615 and/or radio node 611 (and then transmitted from radio node 611 through optical nodes 619a-c (e.g., passive or active optical equipment such as optical filters and/or optical switches) and baseband node 621) to a node of the OSS/Management system 631. Yet another option is that UE device 609 may transmit the assembled data via another installed base station of the wireless mobile/cellular network at block 651.

Figure 7:
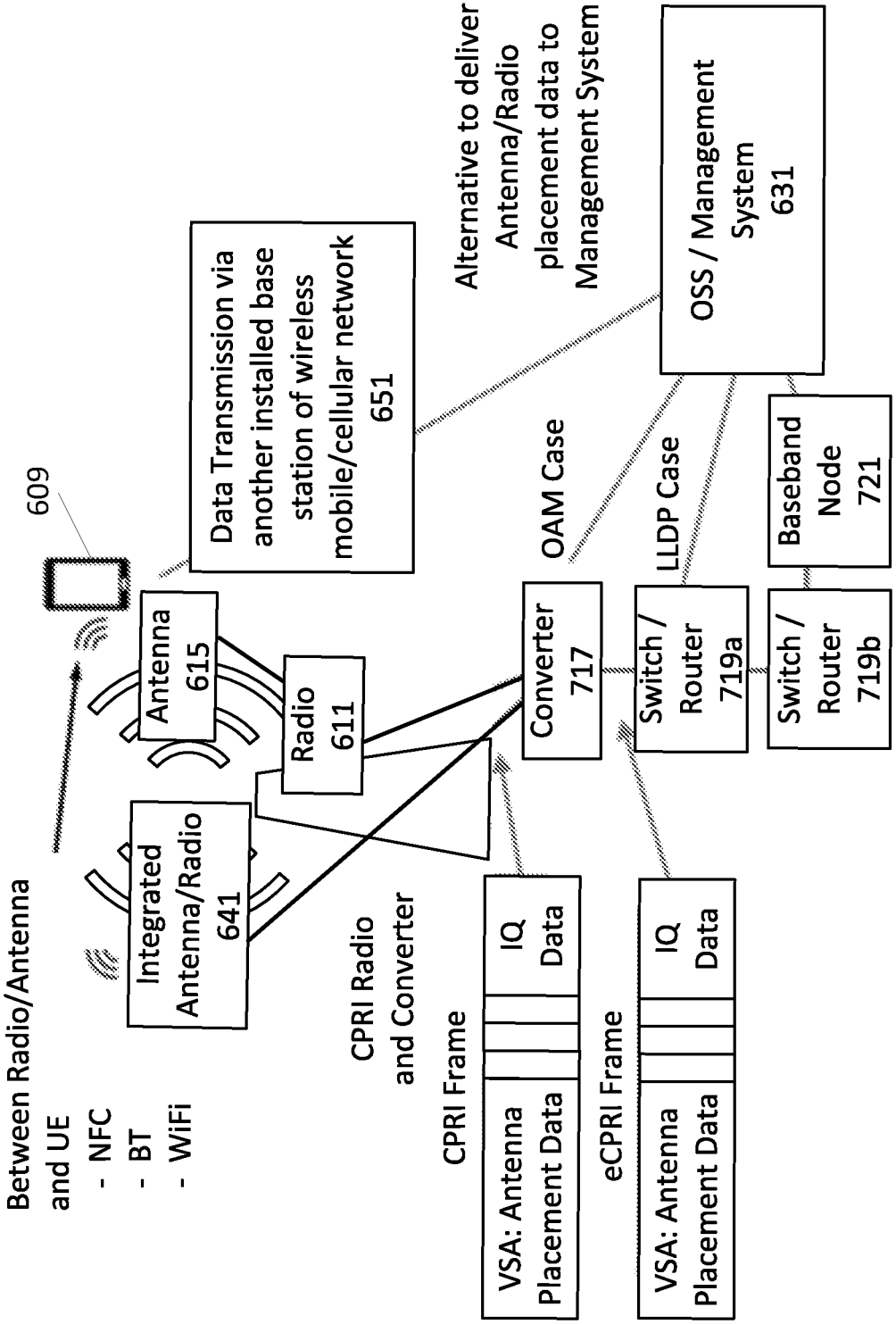

In the example of FIG. 7, radio node 611 is connected using a CPRI connection to converter 717 that converts a CPRI frame from radio node 611 into an eCPRI frame for transport over a packet network/connection. The assembled data from the Radio node 611 is added into the CPRI frame as a VSA. At converter 717, several options are possible.

One option is that the VSA of the CPRI frame can be transparently mapped by converter 717 into the eCPRI frame, transported (through a packet network, e.g., including switches/routers 719a and 719b) to a baseband node 721, that reads out the data and sends it to a node of the OSS/management system 631.

Another option is that converter 717 reads out the assembled data from the VSA of the CPRI frame and sends it over an Operations Administration and Management (OAM) connection to a node of the OSS/management system 631.

Still another option could be that converter 717 reads out the assembled data from the VSA of the CPRI frame and sends it over an LLDP connection through a connected switch/router 719a, that in-turn sends the assembled data to a node of the OSS/management system 631. LLDP may be referenced at Institute of Electrical and Electronics Engineers (IEEE) 802.1AB-2016—IEEE Standard for Local and metropolitan area networks—Station and Media Access Control Connectivity Discovery; Published 2016-03-11; (https://standards.ieee.org/standard/802_1AB-2016.html). Yet another option is that UE device 609 may transmit the assembled data via another installed base station of the wireless mobile/cellular network at block 651.

Figure 8:
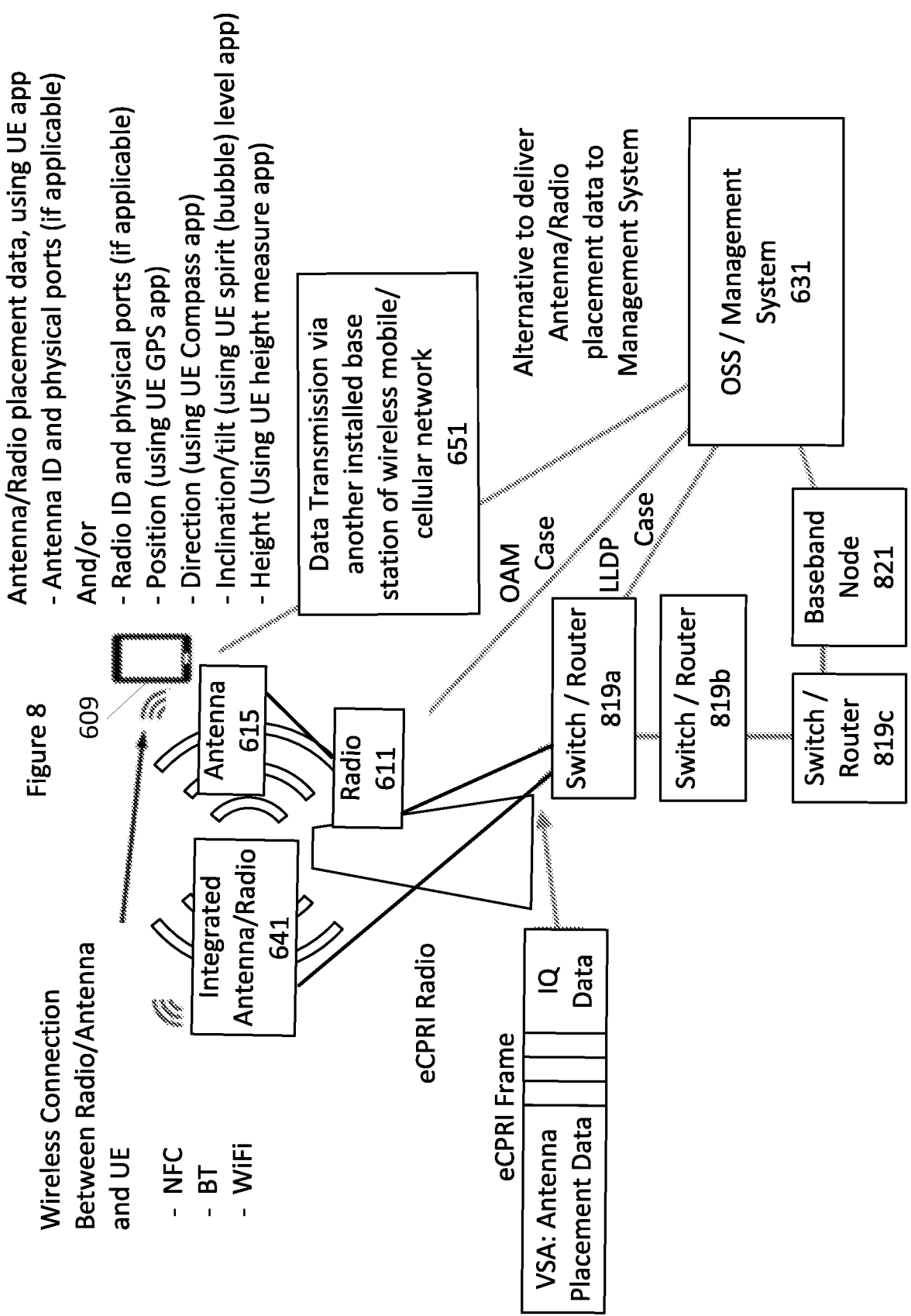

In the example of FIG. 8, radio node 611 is connected using an eCPRI connection through a packet network (e.g., including switches/routers 819a, 819b, and 819c) for transport over a packet network/connection. Several options to send the assembled data to a node of the OSS/management system are discussed below.

In FIG. 8, UE device 609 may thus obtain antenna/radio node physical installation data (e.g., antenna position, antenna direction, antenna tilt, antenna height, etc.) and/or identifier data (e.g., antenna identifier, radio node identifier, transport node identifier, port identifiers, etc.). The physical installation data may be obtained as discussed above with respect to FIGS. 5A, 5B, 5C, and 5D. The identifier data may be obtained, for example, via a short range wireless communication (e.g., NFC, Bluetooth, WiFi, etc.) from radio node 611 and/or antenna node 615, or via a camera.

One option is that the assembled data in the radio node 611 is added into the eCPRI frame as a VSA and transparently transported (through a packet network, e.g., including switches/routers 819a, 819b, and 819c) to a baseband node 821, where baseband node 821 reads out the data and sends it to a node of the OSS/management system 631.

Another option is that the radio node 611 sends the data over an OAM connection to the OSS/management system 631.

Still another option could be that the radio node 611 sends the assembled data over an LLDP connection to a connected switch 819a of a packet network, that in-turn sends the data to a node of the OSS/management system 631.

Yet another option is that UE device 609 may transmit the assembled data via another installed base station of the wireless mobile/cellular network at block 651.

Figure 9:
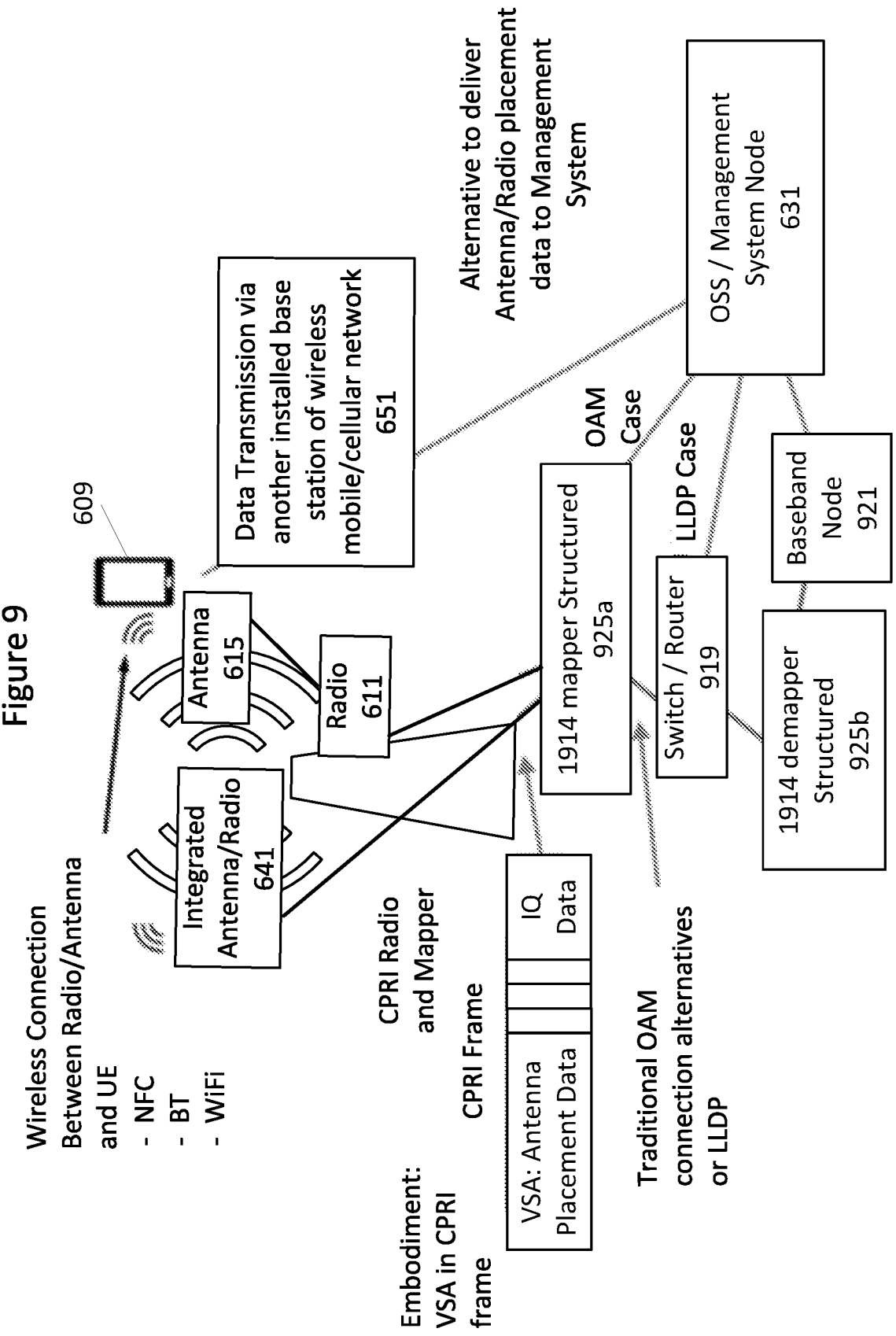

In the example of FIG. 9, the radio node 611 is connected using a CPRI connection to an IEEE 1914 CPRI-mapper function node 925a (also referred to as an ethernet mapper) that maps CPRI frames into an ethernet frame(s) for transport over a packet network/connection (e.g., including switch/router 919). Reference is made to IEEE 1914.3-2018 (IEEE Standard for Radio Over Ethernet Encapsulations and Mappings; COM/MobiNet-SC—Mobile Communication Networks Standards Committee; Published 2018-10-05; (https://standards.ieee.org/standard/1914_3-2018.html)). At the 1914-mapper function node 925a several options are possible.

In FIG. 9, UE device 609 may thus obtain antenna/radio node physical installation data (e.g., antenna position, antenna direction, antenna tilt, antenna height, etc.) and/or identifier data (e.g., antenna identifier, radio node identifier, transport node identifier, port identifiers, etc.). The physical installation data may be obtained as discussed above with respect to FIGS. 5A, 5B, 5C, and 5D. The identifier data may be obtained, for example, via a short range wireless communication (e.g., NFC, Bluetooth, WiFi, etc.) from radio node 611 and/or antenna node 615, or via a camera.

One option is that the VSA (including the assembled data) can be transparently transported from mapper 925a through the packet network (e.g., including switch/router 919) and IEEE 1914 CPRI-demapper) to baseband node 921 where the 1914-frame (ethernet frame) is demapped (e.g., by ethernet demapper 925b) back to a CPRI frame, and baseband node 921 reads out the assembled data and sends it to a node of the OSS/management system 631. In some embodiments, radio node 611 may provide the assembled data (e.g., including physical installation data and identifier data) in the VSA of an CPRI frame, 1914 mapper structured 925a may provide the assembled data from the CPRI frame through the packet network to 1914 demapper structured 925b.

Another option is that the 1914-mapper 925a reads out the assembled data and sends it over an OAM connection to a node of the OSS/management system 631.

Still another option is that the 1914-mapper 925a reads out the assembled data and sends it over an LLDP connection to a connected switch (e.g., switch/router 919), that in-turn sends the assembled data to a node of the OSS/management system 631.

According to some embodiments, a system application may be provided for automated configuration of installed equipment/nodes. In such embodiments, all assembled Antenna site physical installation data may be automatically sent to an OSS/management application to be stored as documentation of site installation. The OSS/management application may thus have access to all Radio Access Network (RAN) and Core equipment information and also transport network information. Based on the received new installation data and existing data, the OSS/management application may automatically generate applicable configuration data and parameters for the new installed and related Radio/Antenna, Baseband, Transport and Core equipment/nodes. According to some embodiments of inventive concepts, more efficient documentation of a base station installation data may be provided. Some embodiments may reduce planning and preparation work and/or provide the configuration data and/or documentation of the system and physical location of the site equipment. Some embodiments may also reduce/minimize a risk of errors from mistakes in physical installation of equipment and/or mismatch in configuration data between Radio/Antenna, BB, and/or Transport equipment/nodes, and/or time required for correction of installation errors may be reduced. Such embodiments may also simplify the process to handle changes in the network and/or reduce/minimize inconsistency in the documentation.

Some embodiments of inventive concepts may be based on using a UE device with apps on site to automatically identify the Radio/Antenna equipment/nodes as such, the position, location, height, tilt, and directions of the Radio/Antenna including connection(s) to transport equipment/nodes. The UE device can also be used to identify BB and Transport equipment/nodes if they are not already automatically identified via the port connection. This information can be automatically sent to an OSS/Management system application.

Several methods can be used to identify equipment/nodes, connection ports, etc. For example, short-range wireless connection or bar-code/QR-code may be used. Assembled data can automatically be sent from the UE device via a Wireless mobile/cellular network connection/communication to the OSS/management system and/or transferred back to equipment for further automatic transfer to management systems.

Operations of the user equipment, UE, device 300 (implemented using the structure of the block diagram of FIG. 3A) will now be discussed with reference to the flow chart of FIG. 10 according to some embodiments of inventive concepts. For example, modules may be stored in memory 305 of FIG. 3, and these modules may provide instructions so that when the instructions of a module are executed by respective UE processing circuitry 303, processing circuitry 303 performs respective operations of the flow chart.

At block 1010, processing circuitry 303 may provide a prompt through user interface 307 (e.g., a visual/text prompt on a touch sensitive display of user interface 307, an audio prompt through a speaker of user interface 307, etc.) for a user of UE device 300 to position UE device 300 physically against the antenna.

At block 1020, processing circuitry 303 may accept user input indicating that the UE device is physically positioned against the antenna (after providing the prompt). The user input may be accepted through user interface 307 (e.g., through a touch sensitive display of user interface 307, a physical button of user interface 307, voice command received through a microphone of user interface 307, etc.).

At block 1030, processing circuitry 303 may obtain installation data relating to an antenna of a radio access network (RAN) node, where the installation data may include physical installation data and/or identifier data.

The physical installation data may be obtained responsive to accepting the user input indicating that UE device 300 is physically positioned against the antenna, and the physical installation data may include at least one of a location of the antenna, a height of the antenna, a direction of the antenna, and/or a tilt of the antenna as discussed above, for example, with respect to FIGS. 5A 5B, 5C, and 5D. For example, processing circuitry 303 may obtain the location of the antenna using information from a Global Navigation Satellite System (GNSS) application running on the UE device (e.g., based on signals/information from GNSS receiver 311); processing circuitry 303 may obtain the height of the antenna using information from the GNSS application running on the UE device (e.g., based on signals/information from GNSS receiver 311); processing circuitry 303 may obtain the direction of the antenna using the GNSS application and/or compass application running on the UE device (e.g., based on signals/information from GNSS receiver 311); and/or processing circuitry 303 may obtain the tilt of the antenna using a level application running on the UE device (e.g., based on signals/information from sensors 309, such as accelerometers). By obtaining the physical installation data while the UE device is positioned against the antenna in a defined manner, a location, height, direction, and/or tilt of the UE device may be considered to be the same as a location, height, direction, and/or tilt of the antenna.

At block 1030, obtaining the installation data may also include obtaining identifier data including an identification of a radio node of the RAN node that is associated with the antenna of the RAN node. If the radio node and the antenna comprise an integrated antenna/radio node, the identification of the radio node may be an identification of the integrated antenna/radio node. If the antenna is coupled with the radio node via a cable and an antenna port of the radio node, the identifier data may further include at least one of an identifier of the antenna and/or an identifier of the antenna port of the radio node.

According to some embodiments, the identifier data may further include at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node.

According to some embodiments, the RAN node may include a transport node, and the identifier data may further include at least one of an identifier of the transport node that is coupled with the radio node, an identifier of a radio port of the transport node that is coupled with the radio node, and/or an identifier of a transport port of the radio node that is coupled with the transport node.

According to some embodiments of inventive concepts, processing circuitry 303 may obtain the identifier data at block 1030 via a short range wireless communication (e.g., a WiFi communication, a BlueTooth communication, a Near Field Communication, etc.) received from an element of the RAN node (e.g., as discussed above with respect to operation 1 of FIG. 4). According to some other embodiments of inventive concepts, processing circuitry 303 may obtain at least one identifier as a radio frequency identifier, RFID. According to still other embodiments of inventive concepts, processing circuitry 303 may obtain the identifier data optically using camera 315 of the UE device. Using camera 315, for example, processing circuitry 303 may accept a digital image of at least one of a bar code and/or a QR-code from the camera 315, from which the identifier data may be determined. For example, processing circuitry 303 may provide a prompt (e.g., a visual prompt through a display of user interface 307, an audio prompt through a speaker of user interface 307, etc.) for a user of the UE device to take a picture of the identifier data using camera 315, and processing circuitry 303 may obtain the identifier data using data from the camera 315 responsive to user input to capture an image.

At block 1040, processing circuitry 303 may transmit the installation data from UE device 300 through transceiver 301 to a management system for a wireless communication network including the RAN node. According to some embodiments, the RAN node for which the installation data is being collected may be a first RAN node, and the installation data may be transmitted (through transceiver 301) to the management system using a wireless mobile/cellular network communication via a second RAN node different than the first RAN node (e.g., as discussed above with respect to operation 2b of FIG. 4). According to some other embodiments, the installation data may be transmitted (through transceiver 301) to the management system using a short range wireless communication (e.g., WiFi, BlueTooth, etc.) via the RAN node (e.g., as discussed above with respect to operation 2a' of FIG. 4). For example, a radio node of the RAN node may include a short range wireless communication receiver allowing the RAN node to receive the installation data from the UE device and forward the installation data to the management system. At block 1050, processing circuitry 303 may provide an indication for the user through user interface 307 (e.g., providing a visual/text indication through a display of user interface 307, providing an audio indication through a speaker of user interface 307, etc.) that the physical installation data has been obtained after obtaining the physical installation data.

Figure 10:
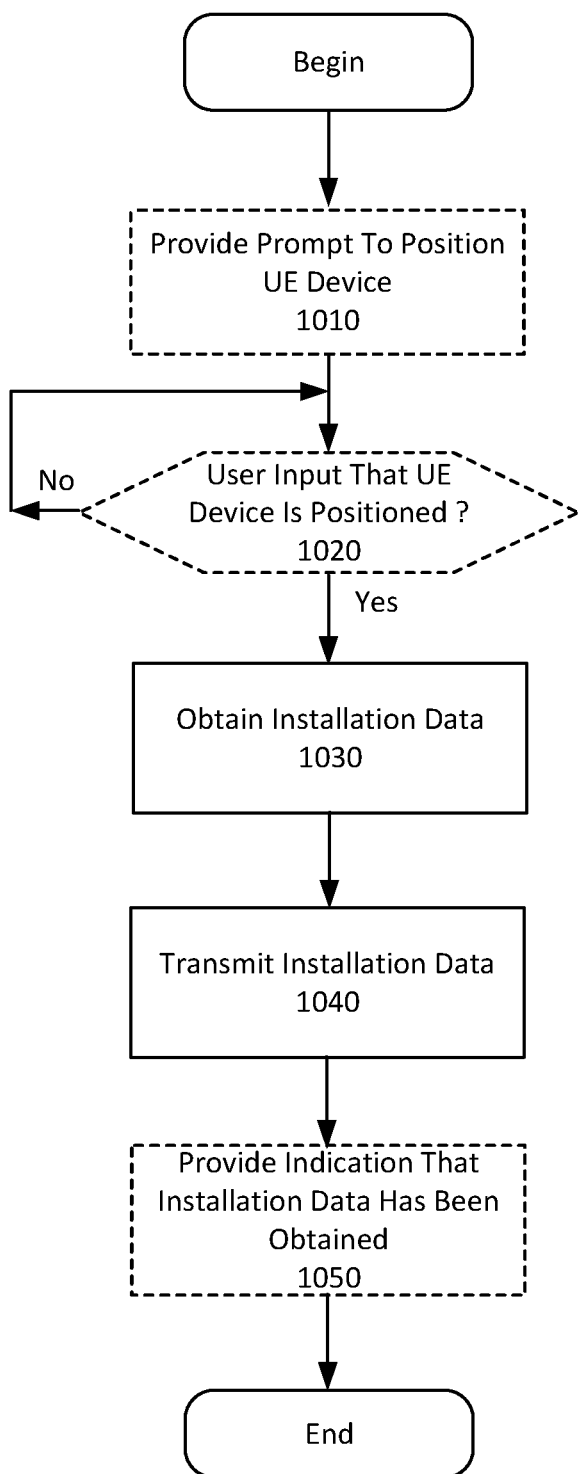
FIG. 10 is a flow chart illustrating operations of a UE device according to some embodiments of inventive concepts.

Various operations from the flow chart of FIG. 10 may be optional with respect to some embodiments of wireless devices and related methods. Regarding methods of some embodiments, for example, operations of blocks 1010, 1020, and/or 1050 of FIG. 10 may be optional.

Operations of a radio node 400 (implemented using the structure of FIG. 3B) of a RAN node will now be discussed with reference to the flow chart of FIG. 11 according to some embodiments of inventive concepts. For example, modules may be stored in memory 405 of FIG. 3B, and these modules may provide instructions so that when the instructions of a module are executed by respective radio node processing circuitry 403, processing circuitry 403 performs respective operations of the flow chart.

At block 1110, processing circuitry 403 may obtain installation data relating to the RAN node, and the installation data may include physical installation data relating to an antenna of the RAN node that is associated with radio node 400 and/or identifier data including an identification of the radio node. For example, the installation data may be received from a user equipment (UE) device using a short range wireless communication (e.g., a WiFi communication, a BlueTooth communication, etc.) that is received through short range wireless communication interface 407 as discussed above, for example with respect to operation 2a' of FIG. 4.

Obtaining the installation data may include obtaining the physical installation data including at least one of a location of the antenna, a height of the antenna, a direction of the antenna, and/or a tilt of the antenna.

Obtaining the installation data may also include obtaining the identifier data including an identification of the radio node 400. According to some embodiments of inventive concepts, the radio node and the antenna may be an integrated antenna/radio node, and the identification of the radio node may thus be an identification of the integrated antenna/radio node. According to some other embodiments of inventive concepts, the antenna may be coupled with the radio node via a cable and an antenna port of the radio node (included in input/output ports 401), and the identifier data may further include at least one of an identifier of the antenna and/or an identifier of the antenna port of the radio node. The identifier data may also include at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node.

At block 1120, processing circuitry 403 may transmit the installation data (including the physical installation data and/or the identifier data) from the radio node through a transport node to a management system for a wireless communication network including the RAN node, as discussed above, for example, with respect to operation 2a" of FIG. 4. Transmission of installation data from the radio node to the management system according to some embodiments is further discussed above with respect to FIGS. 6, 7, 8, and 9. Processing circuitry 403, for example, may transmit the installation data to the transport node through a transport node port included in input/output ports 401.

According to some embodiments, the installation data may be transmitted as an attribute in a common public radio interface (CPRI) frame over a CPRI connection with the transport node, where the attribute may be a Vendor Specific Attribute (VSA) in a CPRI frame. According to some other embodiments, the installation data may be transmitted as an attribute in an enhanced common public radio interface (eCPRI frame) over an eCPRI connection with the transport node, where the attribute may be a Vendor Specific Attribute (VSA) in the eCPRI frame. According to still other embodiments, the installation data may be transmitted using an Internet Protocol (IP) communication. According to yet other embodiment, the installation data may be transmitted using an Ethernet communication, such as a Link Layer Discovery Protocol (LLDP) Ethernet communication.

Figure 11:
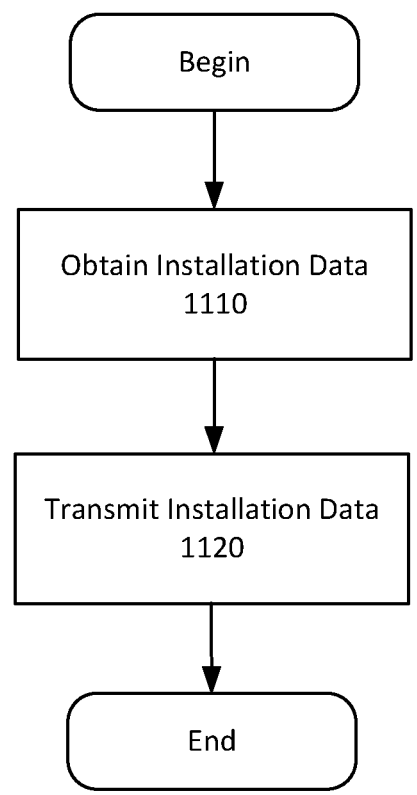
FIG. 11 is a flow chart illustrating operations of a radio node according to some embodiments of inventive concepts.

Various operations from the flow chart of FIG. 11 may be optional with respect to some embodiments of radio nodes and related methods.

Operations of a management node 500 (implemented using the structure of FIG. 3C) will now be discussed with reference to the flow chart of FIG. 12 according to some embodiments of inventive concepts. For example, modules may be stored in memory 505 of FIG. 3C, and these modules may provide instructions so that when the instructions of a module are executed by respective processing circuitry 503, processing circuitry 503 performs respective operations of the flow chart.

At block 1210, processing circuitry 503 may receive installation data relating to an antenna of a radio access network, RAN node, where the installation data may include physical installation data and/or identifier data. According to some embodiments, the installation data may be received from the RAN node. According to some other embodiments, the RAN node may be a first RAN node, and the installation data may be received from a user equipment (UE) device via a second RAN node.

The physical installation data may include at least one of a location of the antenna, a height of the antenna, a direction of the antenna, and/or a tilt of the antenna.

The identifier data may include an identification of a radio node that is associated with the antenna. According to some embodiments, the radio node and the antenna may be provided as an integrated antenna/radio node, and the identification of the radio node may thus be an identification of the integrated antenna/radio node. According to some other embodiments, the antenna may be coupled with the radio node via a cable and an antenna port of the radio node, and the identifier data may further include at least one of an identifier of the antenna and/or an identifier of the antenna port of the radio node.

According to some embodiments, the identifier data may include at least one of an identifier of the antenna, an identifier of an antenna port of the radio node that is coupled with the antenna, an identifier of a transport node that is coupled with the radio node, an identifier of a radio port of the transport node that is coupled with the radio node, and/or an identifier of a transport port of the radio node that is coupled with the transport node. The identifier data may include at least one of a bar code and/or a QR-code.

At block 1220, processing circuitry 503 may generate documentation of an installation of the RAN node based on the installation data responsive to receiving the installation data.

At block 1230, processing circuitry 503 may store the documentation of the installation of the RAN node in electronic memory (e.g., memory 505).

Figure 12:
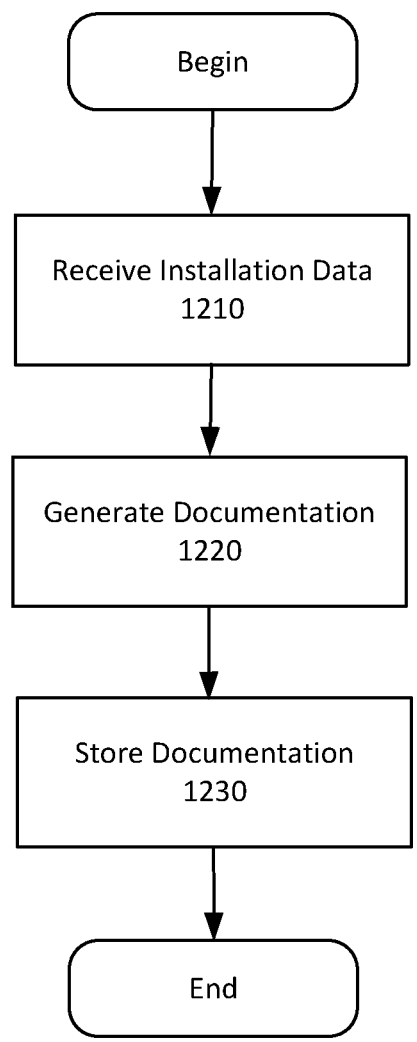
FIG. 12 is a flow chart illustrating operations of a management node according to some embodiments of inventive concepts.

Various operations from the flow chart of FIG. 12 may be optional with respect to some embodiments of management nodes and related methods.

Some embodiments of inventive concepts are based on using automatically identified Radio/Antenna/Baseband/Transport nodes/equipment as such, and positions and/or directions of the Radio/Antenna including its connection(s) to transport and/or Baseband equipment/nodes. In addition, the availability and network locations of baseband resources may also be used. Methods used to collect this information are discussed, for example, herein with respect to FIGS. 4, 5A, 5B, 5C, 5D, 6, 7, 8, 9, 10, 11, and/or 12. Operator added data (such as policy information (e.g., size of a RAN area, size of Transport (Interior Gateway Protocol (IGP)) area, PLMN-ID, etc.)) may also be used. The operator defined data may also define identifier ranges, for example, for eNB, gNB, Tracking area, IP addresses, etc.

This information can then be used to automatically Create and/or Deploy configuration(s) of Radio, Baseband, and/or Transport resources without previous planning and/or configuration.

According to some embodiments of inventive concepts, the planning, preparation and/or configuration work of a communication system may be reduced. Risk of errors from mistakes in physical installation of equipment/nodes and/or mismatch in configuration data between Radio/Antenna, Baseband, and Transport equipment/nodes may also be reduced. Moreover, a process to handle changes in the network may be simplified, and/or a risk of inconsistency may be reduced.

System applications to provide automated configuration of installed equipment/nodes is discussed below.

Installation information for assembled Antenna/Radio, Baseband, and Transport equipment/nodes may be automatically identified (for example, as discussed above with respect to FIGS. 4, 5A, 5B, 5C, 5D, 6, 7, 8, 9, 10, 11, and/or 12) and sent to an OSS application to be stored automatically as documentation of site installation(s). The OSS application has access to all RAN and Core equipment information and also transport network information. Based on the received new installation data and existing data, the application automatically generates and deploys applicable configuration data and parameters for the new installed and related Radio/Antenna, Baseband, Transport and Core equipment/nodes.

According to some embodiments of inventive concepts, one or more of the following operations may be performed in the Automation function of management node 500:
1) Collect Network Data (Static data)
2) Create topology (Geographical and Network)
3) Create logical Network Routing Areas (also referred to as Transport Network Areas)
4) Select Global Transport data (Stateful data)
5) Create transport configuration parameters (also referred to as Transport configuration data or Transport configuration)
6) Calculate a logical RAN connections map (also referred to as a connections possibility map)
7) Create RAN connection map
8) Select stateful RAN data (also referred to as RAN data)
9) Create RAN configuration data (also referred to as a RAN configuration)
10) Provide configuration for wireless mobile/cellular network
11) Deploy configuration for wireless mobile/cellular network Collection of network and/or global data occurs in operation 1. Static data (such as identified geographical position and direction data for RAN equipment) is collected, and data for Transport equipment is also collected. The physical network connection information for RAN and Transport equipment including equipment IDs is also collected.

Operation 1 may also include collecting general mobile operator static data such as PLMN-ID, Radio Spectrum, Operator policies, RAN interface Transport characteristics requirements (e.g., characteristics relating to bandwidth, delay, jitter, sync accuracy, etc.), Operator defined RAN Geographical areas, transport area size (number of nodes), and/or Transport area policies. According to some embodiments, a management node may thus collect network (e.g., including geographic positions, network positions, physical network connections, node identifier data, etc.) and static global data (e.g., including PLMN ID, radio spectrum allocations, operator policies, transport characteristic requirements, operator defined RAN/Transport geographic areas, etc.).

Operation 2, if performed, includes creation of a topology of the wireless mobile/cellular network (also referred to as a Geographical and Network Topology). A topology may be created over all RAN and Transport equipment/node Geographical and Network positions including Network connections. In addition, Operator defined RAN areas may be added.

Operation 3, if performed, includes creation of transport network areas (also referred to as logical transport Network Routing areas). Transport Areas may be created based on created Topology and Transport static data (area size and area policies).

Operation 4, if performed, includes selection of global transport data (also referred to as stateful Transport data or stateful global transport data). Stateful Transport data (such as operator defined IGP areas, IP addresses, Node IDs, etc.) may be collected.

Operation 5, if performed, includes creation of a transport configuration (including transport configuration parameters). A Transport nodes IGP configuration (also referred to as an IGP routing configuration) for Transport IGP Areas may be created and deployed, and/or a Transport nodes Border Gateway Protocol (BGP) configuration (also referred to as a BGP routing configuration) may be created and deployed.

Operation 6, if performed, includes calculation of a connections possibility map (also referred to as a logical RAN connections map). A logical map over possible RAN connections (given the RAN connection characteristics requirements) between Radio-Baseband and Baseband-Baseband functions may be calculated. Both Baseband Distributed Unit (BB-DU) and Virtualized Packet Processing (VPP)/Virtualized RAN Controller (VRC) Centralized Unit (CU) functions may be included.

Operation 7, if performed, includes creation of a RAN connections map. RAN nodes may be selected, and the logical RAN map may be created between Radio-Baseband and Baseband-Baseband functions. Both BB-DU and VPP/VRC CU functions may be included.

Operation 8, if performed, includes selection of RAN data (also referred to as stateful RAN data). Based on a RAN connections map (e.g., a map created in operation 7), stateful RAN data (such as eNB ID, gNB ID, Cell ID, Tracking Area, etc.) may be selected.

Operation 9, if performed, includes creation of a RAN configuration (also referred to as RAN configuration parameters or RAN configuration data). Based on all collected and selected RAN data, RAN configuration data may be created and deployed.

Operation 10 includes providing a configuration for the wireless mobile/cellular network. In particular, the configuration for the wireless mobile/cellular network may include one or both of a transport configuration (e.g., one that is received/accessible or created in operation 5) and a RAN configuration (e.g., one that is received/accessible or created in operation 9).

Operation 11 includes deploying the configuration for the wireless mobile/cellular network. As discussed with respect to operation 10, the configuration for the wireless mobile/cellular network includes one or both of a transport configuration (e.g., of operation 5) and a RAN configuration (e.g., of operation 9). Accordingly, deploying the configuration for the wireless mobile/cellular network includes transmitting a RAN configuration to RAN nodes (e.g., radio nodes and baseband nodes) of the wireless mobile/cellular network and/or transmitting a transport configuration to transport nodes (e.g., routers/switches) of the wireless mobile/cellular network.

Figure 13:
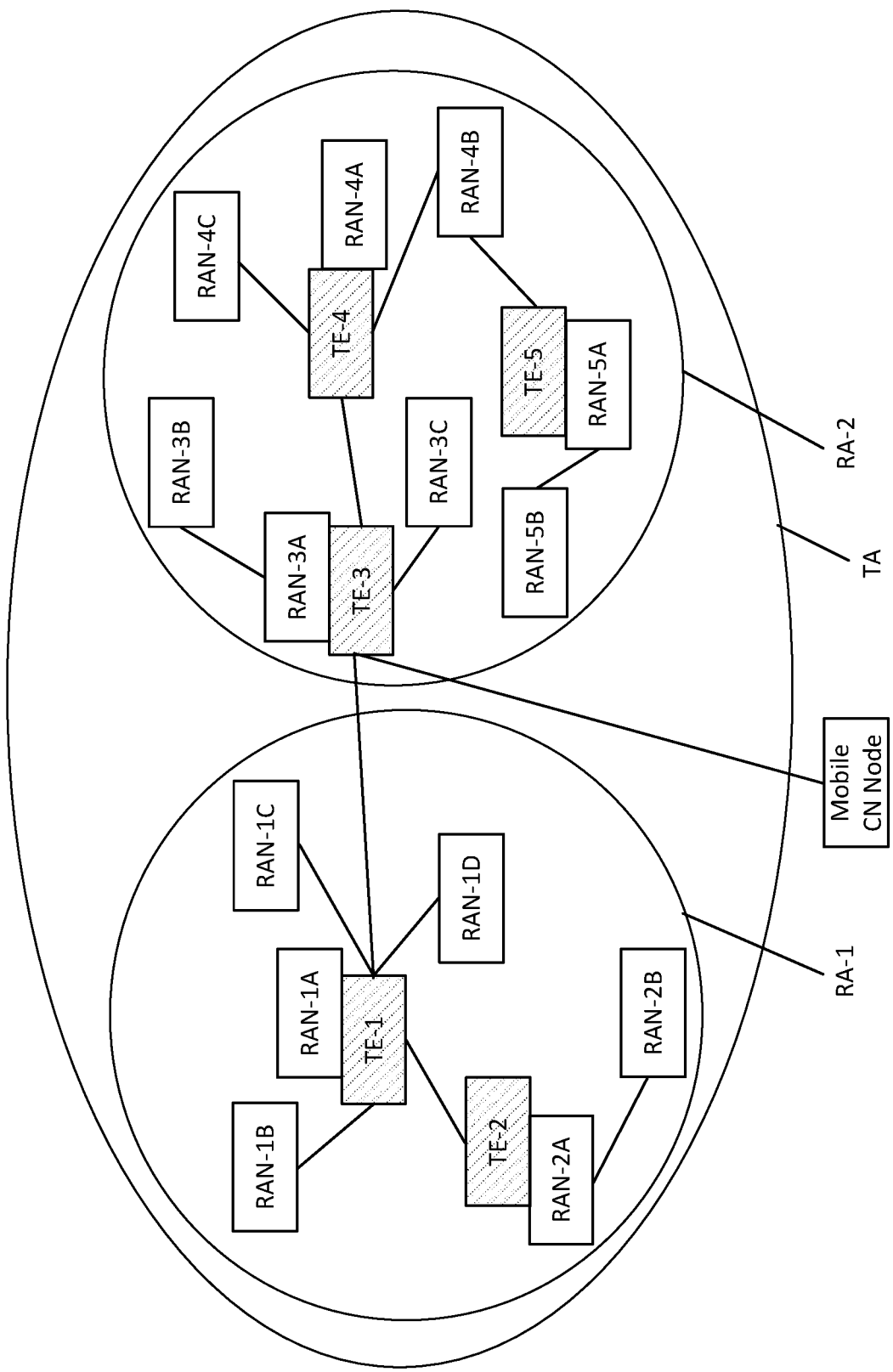
FIG. 13 is a diagram illustrating RAN areas in a transport area according to some embodiments of inventive concepts.

FIG. 13 illustrates an example of a deployment of RAN Areas (RA), RA-1 and RA-2, within a Transport Area (TA). As shown, RAN Area RA-1 includes RAN nodes RAN-1A, RAN-1B, RAN-1C, RAN-1D, RAN-2A, and RAN-2B, and Transport Equipment (TE) (also referred to as transport nodes) TE-1 and TE-2. Moreover, RAN Area RA-2 includes RAN nodes RAN-3A, RAN-3B, RAN-3C, RAN-4A, RAN-4B, RAN-4C, RAN-5A, and RAN-5B and Transport Equipment TE-3, TE-4, and TE-5.

According to some embodiments of inventive concepts, an automated operation(s) may be used to automatically Create and Deploy all RAN and Transport configuration data used/needed for the RAN and transport equipment/nodes.

According to some embodiments of inventive concepts, automated operations may be used to create and Deploy RAN and Transport configuration data for a new RAN and Transport deployment and any changes in the deployment.

Some embodiments of inventive concepts may be based on using automatic identification of the Radio/Antenna, Baseband, and Transport nodes/equipment, and geographical data including connection(s) between the equipment as discussed above with respect to FIGS. 4, 5A, 5B, 5C, 5D, 6, 7, 8, 9, 10, 11, and/or 12.

Some embodiments of inventive concepts may reduce the planning and preparation work to produce the configuration data as discussed above with respect to operations 1-9. The work effort to document the system with all physical location and site data, equipment and connections data may be reduced. Risk of errors from mistakes in physical installation of equipment and mismatch in configuration data between Radio/Antenna, Baseband, and Transport equipment may also be reduced. A process to handle changes in the network may be simplified, and/or risks of inconsistency in the documentation may be reduced.

Operations of a management node 500 (implemented using the structure of FIG. 3C) will now be discussed with reference to the flow chart of FIG. 14 according to some embodiments of inventive concepts. For example, modules may be stored in memory 505 of FIG. 3C, and these modules may provide instructions so that when the instructions of a module are executed by respective management node processing circuitry 503, processing circuitry 503 performs respective operations of the flow chart.

Management node 500 is provided for a wireless mobile/cellular network including a Radio Access Network, RAN, having a plurality of RAN nodes and including a transport network having a plurality of transport nodes.

At block 1401, processing circuitry 503 collects network data for the wireless mobile/cellular network, wherein the network data include network installation data relating to the plurality of RAN nodes of the RAN and the plurality of transport nodes of the transport network. For example, operations of block 1401 may be performed according to aspects of operation 1 discussed above, and the network data may be collected through network interface 507. Moreover, the plurality of RAN nodes may include radio nodes and baseband nodes.

At block 1402, processing circuitry 503 may automatically create a topology of the wireless mobile/cellular network based on the network data, wherein the topology defines RAN areas. For example, operations of block 1402 may be performed according to aspects of operation 2 discussed above.

At block 1403, processing circuitry 503 may automatically create a plurality of transport network areas of the wireless mobile/cellular network based on a topology (e.g., one that is received/accessible or created in block 1402), wherein at least one of the transport network areas includes a plurality of the RAN areas. For example, operations of block 1403 may be performed according to aspects of operation 3 discussed above.

At block 1404, processing circuitry 503 may automatically select global transport data for the wireless mobile/cellular network based on a plurality of transport areas (e.g., one that is received/accessible or created in block 1403), wherein the global transport data include at least one of interior gateway protocol, IGP, routing areas, Internet Protocol, IP, addresses, and/or network node identifiers. For example, operations of block 1404 may be performed according to aspects of operation 4 discussed above.

At block 1405, processing circuitry 503 may automatically create a transport configuration for the plurality of transport nodes based on global transport data (e.g., data that are received/accessible or selected in block 1404). For example, operations of block 1405 may be performed according to aspects of operation 5 discussed above. According to some embodiments, the configuration for the wireless mobile/cellular network includes the transport configuration. According to some embodiments, the transport configuration includes IGP and border gateway protocol, BGP, routings for the wireless mobile/cellular network based on global transport data including at least one of IGP routing areas, IP addresses, and/or node identifiers.

At block 1406, processing circuitry 503 may automatically calculate a connections possibility map for the wireless mobile/cellular network based on a transport configuration (e.g., one that is received/accessible or created in block 1405), wherein the connections possibility map defines possible RAN connections between the RAN and/or transport nodes. For example, operations of block 1406 may be performed according to aspects of operation 6 discussed above.

At block 1407, processing circuitry 1407 may automatically create a RAN connections map based on a connections possibilities map (e.g., one that is received/accessible or calculated in block 1406), wherein the RAN connections map defines actual RAN connections between the RAN nodes and/or the transport nodes for the configuration. For example, operations of block 1407 may be performed according to aspects of operation 7 discussed above.

At block 1408, processing circuitry 1408 may automatically select RAN data based on a RAN connections map (e.g., one that is received/accessible or created in block 1407), wherein the RAN data include at least one of gNB/eNB identifiers, IDs, cell IDs, and/or tracking area IDs. For example, operations of block 1408 may be performed according to aspects of operation 8 discussed above.

At block 1409, processing circuitry 503 may automatically create a RAN configuration for the plurality of RAN nodes based on RAN data (e.g., data that are received/accessible or selected in block 1408). For example, operations of block 1409 may be performed according to aspects of operation 9 discussed above.

At block 1410, processing circuitry 503 automatically provides a configuration for the wireless mobile/cellular network based on a RAN configuration (e.g., one that is received/accessible or created in block 1409). For example, operations of block 1410 may be performed according to aspects of operation 10 discussed above. According to some embodiments, the configuration for the wireless mobile/cellular network may be automatically provided based on the output/outputs of one or more of blocks 1401, 1402, 1403, 1404, 1405, 1406, 1407, 1408, and/or 1409. According to some embodiments, the configuration for the wireless mobile/cellular network may include the RAN configuration of block 1409 and the transport configuration of block 1405.

At block 1411, processing circuitry 503 automatically deploys the configuration for the wireless mobile/cellular network to provide configuration of the plurality of RAN nodes and the plurality of transport nodes responsive to providing the configuration for the wireless mobile/cellular network. For example, operations of block 1411 may be performed according to aspects of operation 11 discussed above, and the configuration may be deployed through network interface 507. In one embodiment, automatic deployment of the configuration for the wireless mobile/cellular network is responsive to generating the configuration for the wireless mobile/cellular network. According to some embodiments, the configuration for the wireless mobile/cellular network may be deployed by transmitting respective configuration parameters of the RAN configuration to one or more of the plurality of RAN nodes of the RAN and by transmitting respective configuration parameters of the transport configuration to one or more of the plurality of transport nodes of the transport network.

According to some embodiments, an antenna is associated with each of the radio nodes. In such embodiments, for a radio node, the network installation data of block 1401 includes at least one of a location of the antenna associated with the radio node, a height of the antenna associated with the radio node, a direction of the antenna associated with the radio node, and/or a tilt of the antenna associated with the radio node. Moreover, the configuration of block 1410 may be automatically provided based on at least one of the location of the antenna associated with the radio node, the height of the antenna associated with the radio node, the direction of the antenna associated with the radio node, and/or the tilt of the antenna associated with the radio node. For example, the topology of the wireless mobile/cellular network may be automatically created at block 1402 based on at least one of the location of the antenna associated with the radio node, the height of the antenna associated with the radio node, the direction of the antenna associated with the radio node, and/or the tilt of the antenna associated with the radio node.

According to some embodiments, the network installation data of block 1401 includes respective identifications for one or more of the radio nodes, the baseband nodes, and the transport nodes. Moreover, the configuration of block 1410 may be automatically provided based on the respective identifications for the radio nodes, the baseband nodes, and the transport nodes. For example, the topology of the wireless mobile/cellular network may be automatically created at block 1402 based on the respective identifications for the radio nodes, the baseband nodes, and the transport nodes.

According to some embodiments, at least one of the radio nodes is coupled with an antenna via a cable and an antenna port of the radio node, and the network installation data of block 1401 includes an identifier of the antenna and/or an identifier of the antenna port of the radio node. Moreover, the configuration of block 1410 may be automatically provided based on the identifier of the antenna and/or the identifier of the antenna port. For example, the topology of the wireless mobile/cellular network may be automatically created at block 1402 based on the identifier of the antenna and/or the identifier of the antenna port.

According to some embodiments, one of the radio nodes is coupled with one of the transport nodes, and the network installation data of block 1401 includes at least one of an identifier of a port of the transport node that is coupled with the radio node and/or an identifier of a port of the radio node that is coupled with the transport node. Moreover, the configuration of block 1410 may be automatically provided based on the identifier of a port of the transport node and/or the identifier of a port of the radio node. For example, the topology of the wireless mobile/cellular network may be automatically created at block 1402 based on the identifier of a port of the transport node and/or the identifier of a port of the radio node.

According to some embodiments, the network data of block 1401 further includes static global data including at least one of a Public Land Mobile Network, PLMN, identifier, ID, for the wireless mobile/cellular network, a radio spectrum allocation for the wireless mobile/cellular network, operator policies for the wireless mobile/cellular network, transport characteristic requirements for connections between the RAN nodes for the wireless mobile/cellular network, geographic definition of RAN areas for the wireless mobile/cellular network, and/or geographic definitions of transport areas for the wireless mobile/cellular network. Moreover, the configuration of block 1410 may be automatically provided based on the network installation data and based on the static global data. For example, the topology of the wireless mobile/cellular network may be automatically created at block 1402 based on the network installation data and based on the static global data.

Figure 14:
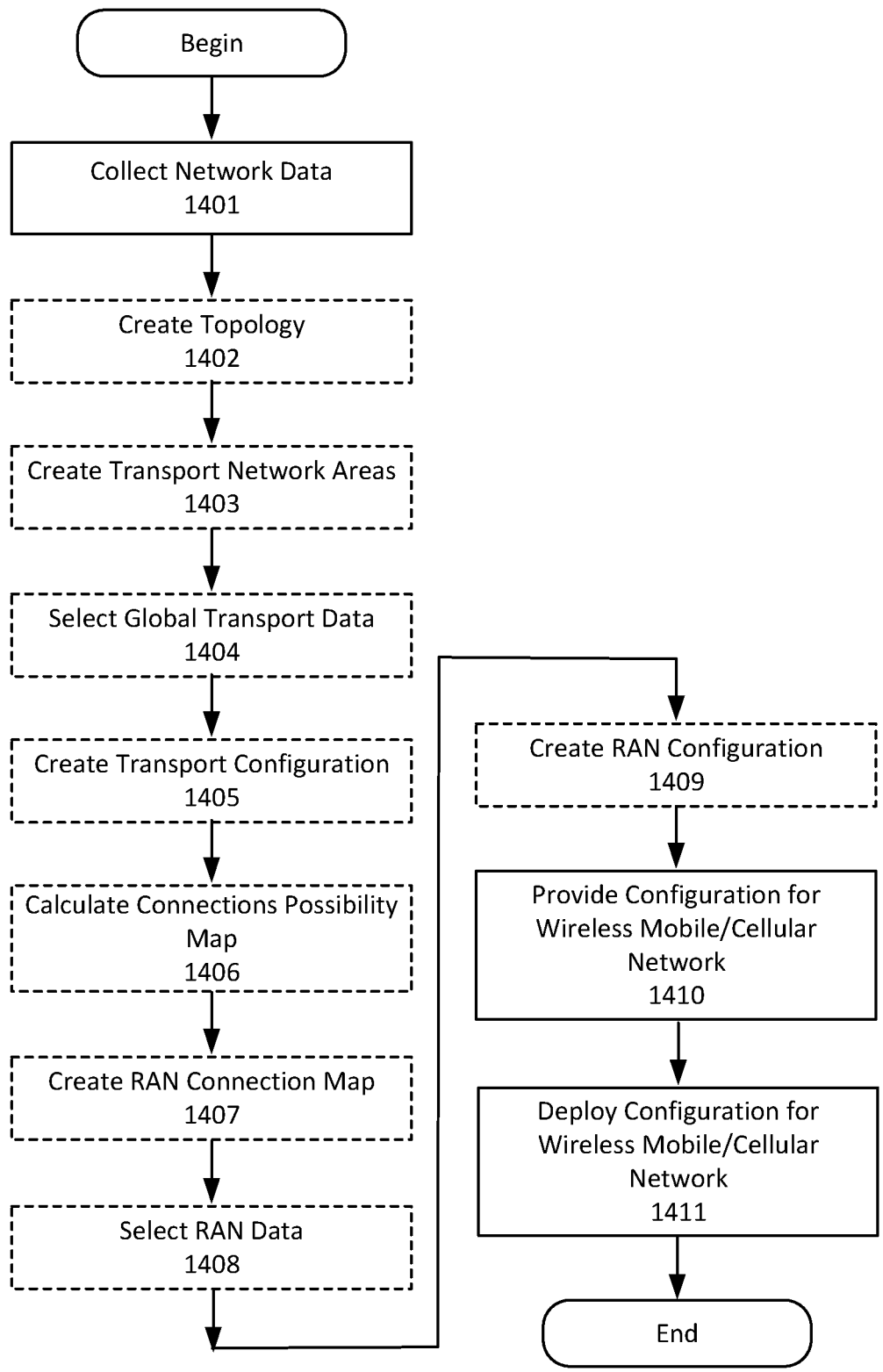
FIGS. 14 and 15 are flow charts illustrating operations of a management node according to some embodiments of inventive concepts.

Various operations from the flow chart of FIG. 14 may be optional with respect to some embodiments of management nodes and related methods. Regarding methods of some embodiments, for example, operations of blocks 1402, 1403, 1404, 1405, 1406, 1407, 1408, and/or 1409 of FIG. 14 may be optional.

Operations of a management node 500 (implemented using the structure of FIG. 3C) will now be discussed with reference to the flow chart of FIG. 15 according to some embodiments of inventive concepts. For example, modules may be stored in memory 505 of FIG. 3C, and these modules may provide instructions so that when the instructions of a module are executed by respective management node processing circuitry 503, processing circuitry 503 performs respective operations of the flow chart.

Management node 500 is provided for a wireless mobile/cellular network including a Radio Access Network, RAN, having a plurality of RAN nodes and including a transport network having a plurality of transport nodes.

At block 1501, processing circuitry 503 collects network data for the wireless mobile/cellular network, wherein the network data include network installation data relating to the plurality of RAN nodes of the RAN and the plurality of transport nodes of the transport network. For example, operations of block 1501 may be performed according to aspects of operation 1 discussed above.

At block 1510, processing circuitry 503 automatically provides a configuration for the wireless mobile/cellular network based on the network data. For example, operations of block 1510 may be performed according to aspects of operation 10 discussed above. According to some embodiments, the configuration comprises a RAN configuration for the plurality of RAN nodes of the RAN and a transport configuration for the plurality of transport nodes of the transport network.

At block 1511, processing circuitry 503 automatically deploys the configuration to provide configuration of the plurality of RAN nodes and the plurality of transport nodes responsive to providing the configuration. For example, operations of block 1511 may be performed according to aspects of operation 11 discussed above. In one embodiment, automatic deployment of the configuration is responsive to generating the configuration. According to some embodiments, the configuration comprises a RAN configuration that is deployed to the RAN including the plurality of RAN nodes, and the configuration comprises a transport configuration that is deployed to the transport network including the plurality of transport nodes.

Figure 15:
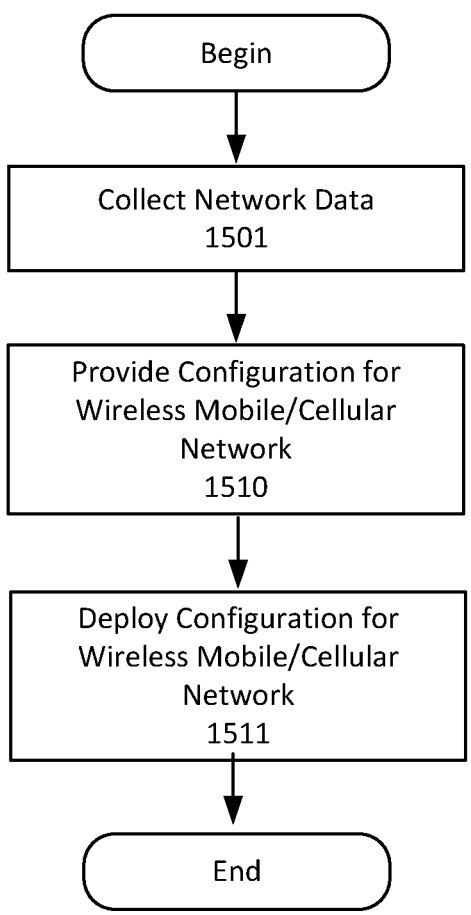

Various operations from the flow chart of FIG. 15 may be optional with respect to some embodiments of management nodes and related methods.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and an RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636.

Power circuitry 1637 may perform any formatting, converting, or other modification to the power from power source 1636 to make the power suitable for the respective components of WD 1610 to which power is supplied.

Figure 17:
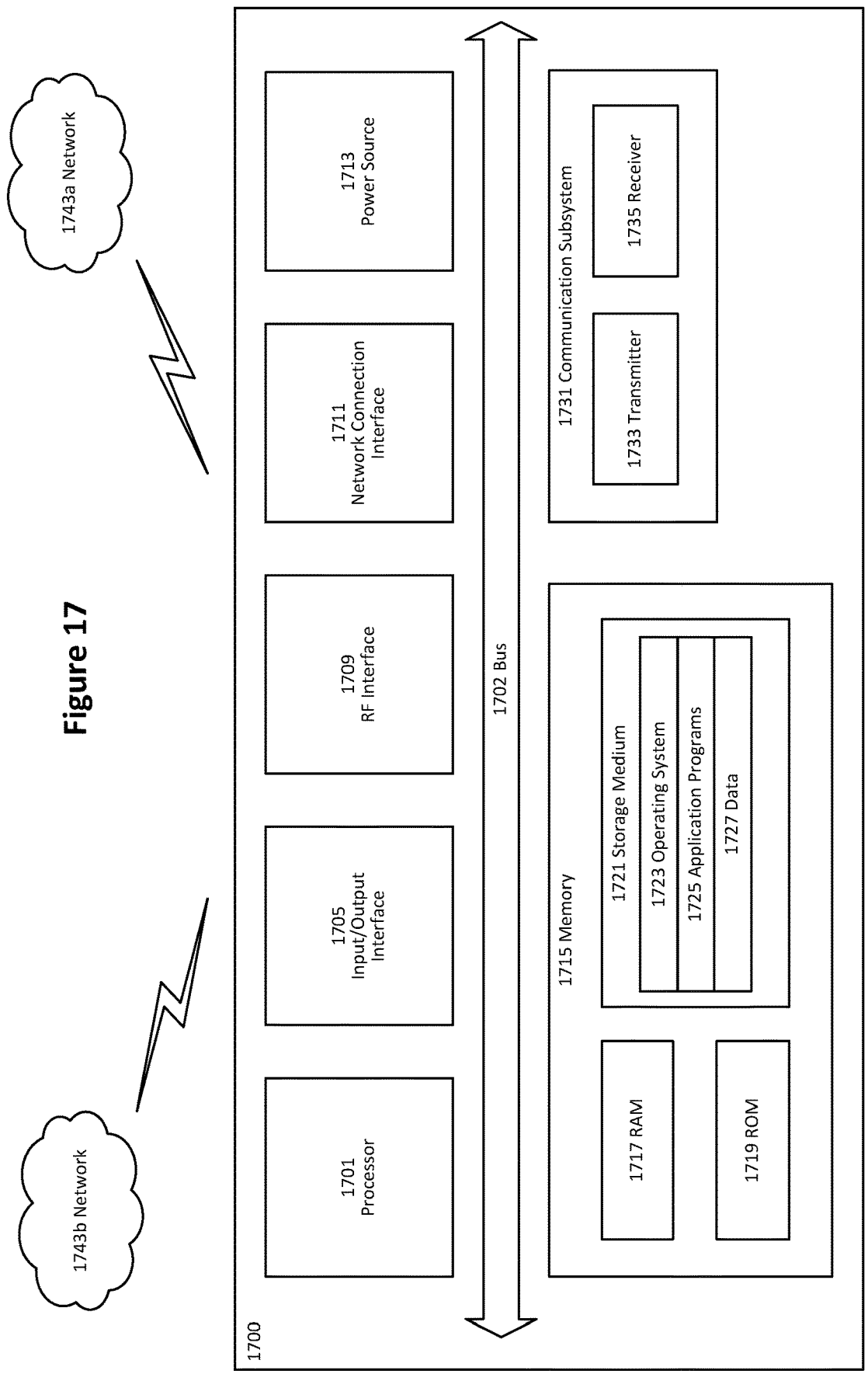
FIG. 17 is a block diagram of a user equipment in accordance with some embodiments

FIG. 17 illustrates a user Equipment in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the 3rd Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GNSS/GPS) to determine a location, another like communication function, or any combination thereof. For example, communication subsystem 1731 may include cellular communication, Wi-Fi communication, Bluetooth communication, and GNSS/GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
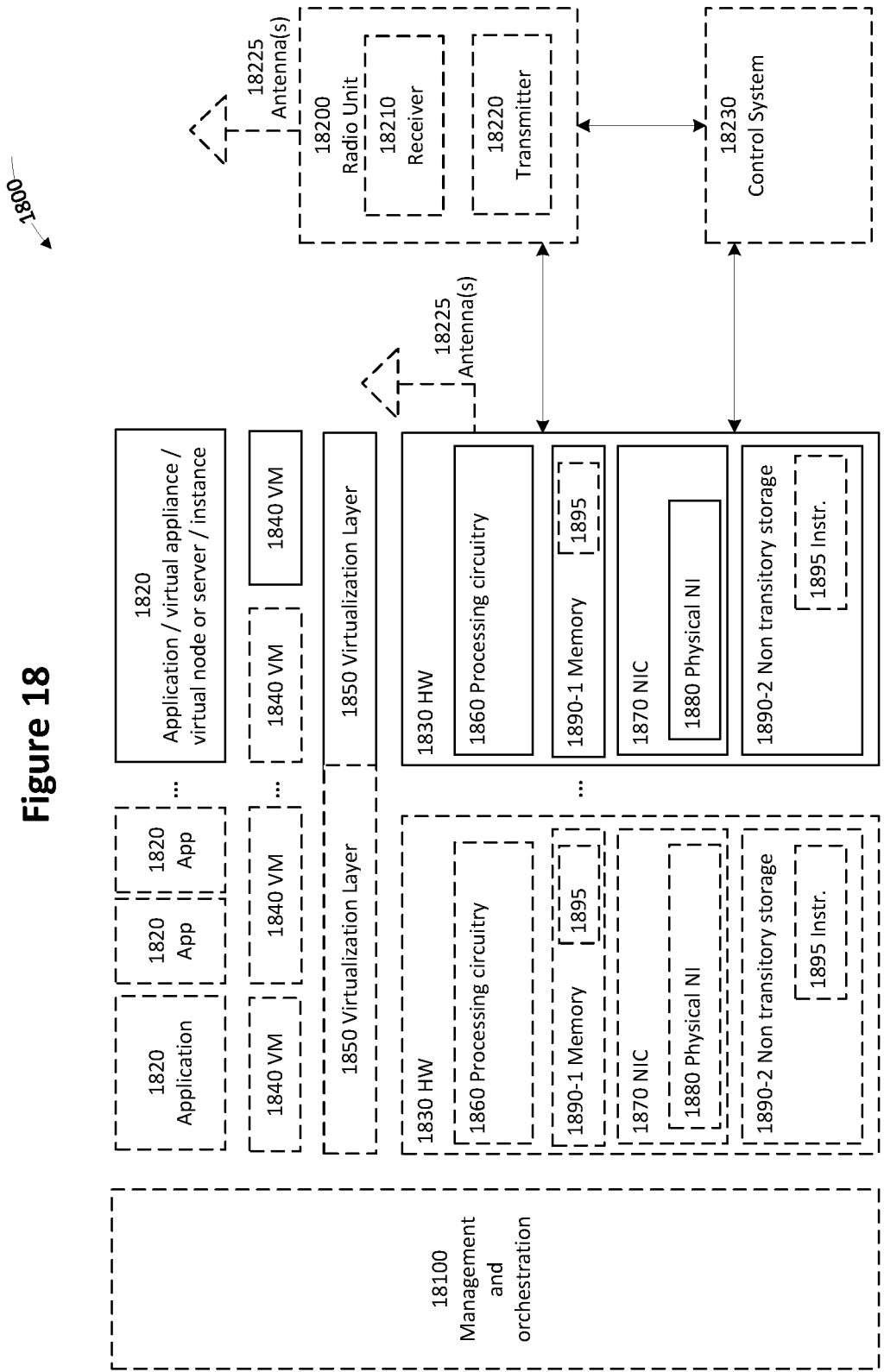
FIG. 18 is a block diagram of a virtualization environment in accordance with some embodiments.

FIG. 18 illustrates a virtualization environment in accordance with some embodiments.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be affected with the use of control system 18230 which may alternatively be used for communication between the hardware nodes 1830 and radio units 18200.

Figure 19:
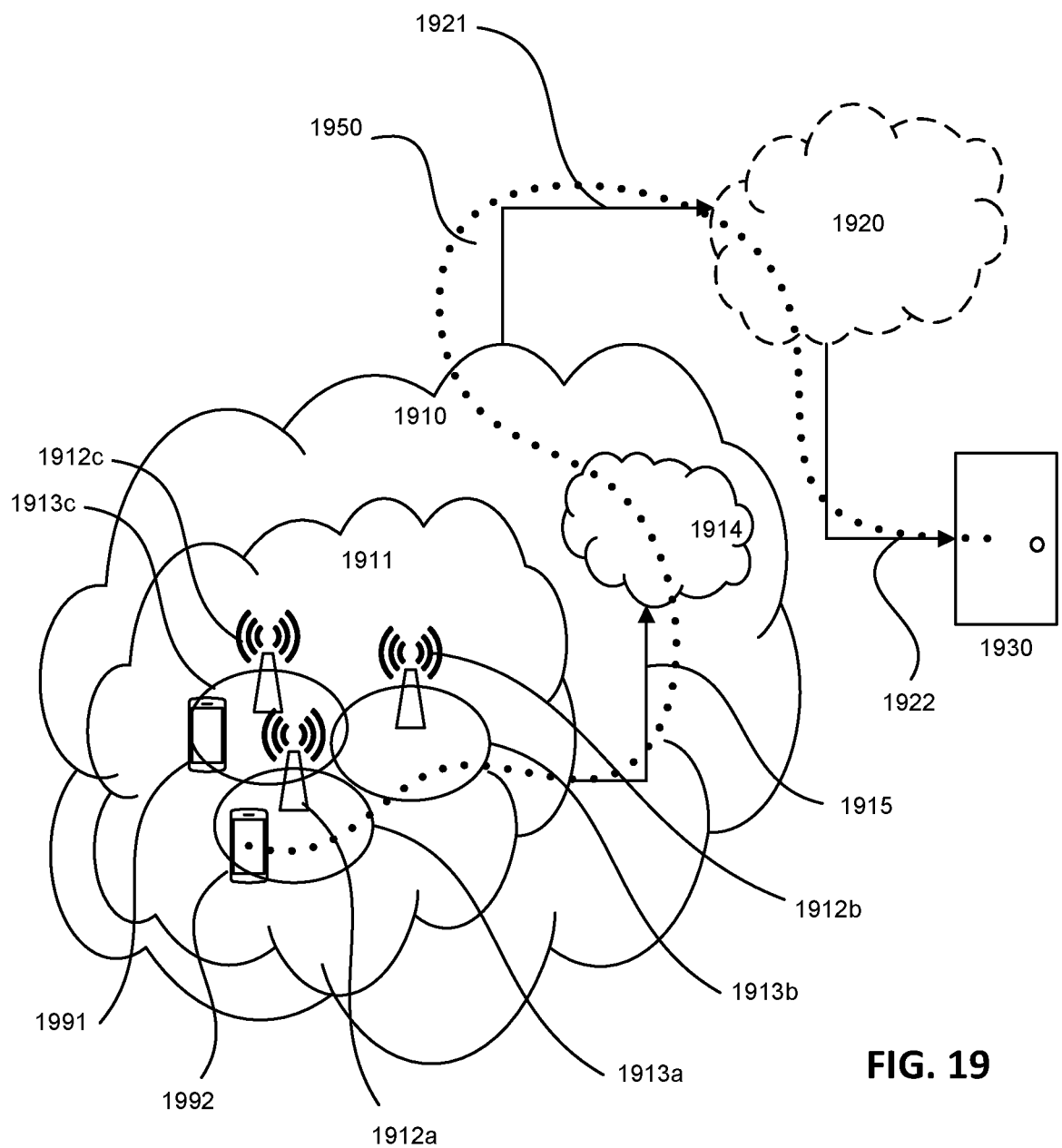
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
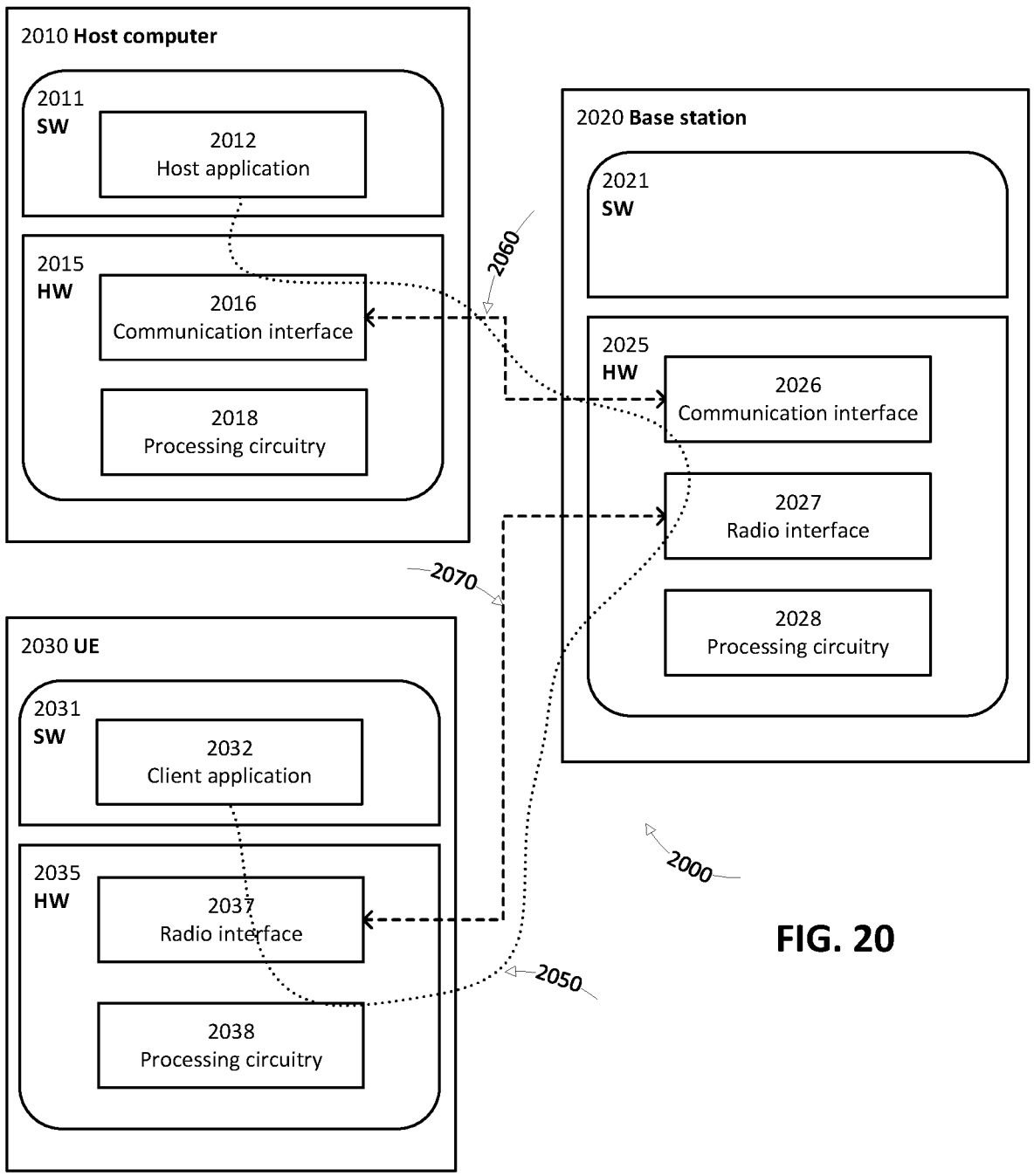
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912a, 1912b, 1912c and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments may improve the performance of OTT services provided to UE 2030 using OTT connection 2050, in which wireless connection 2070 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
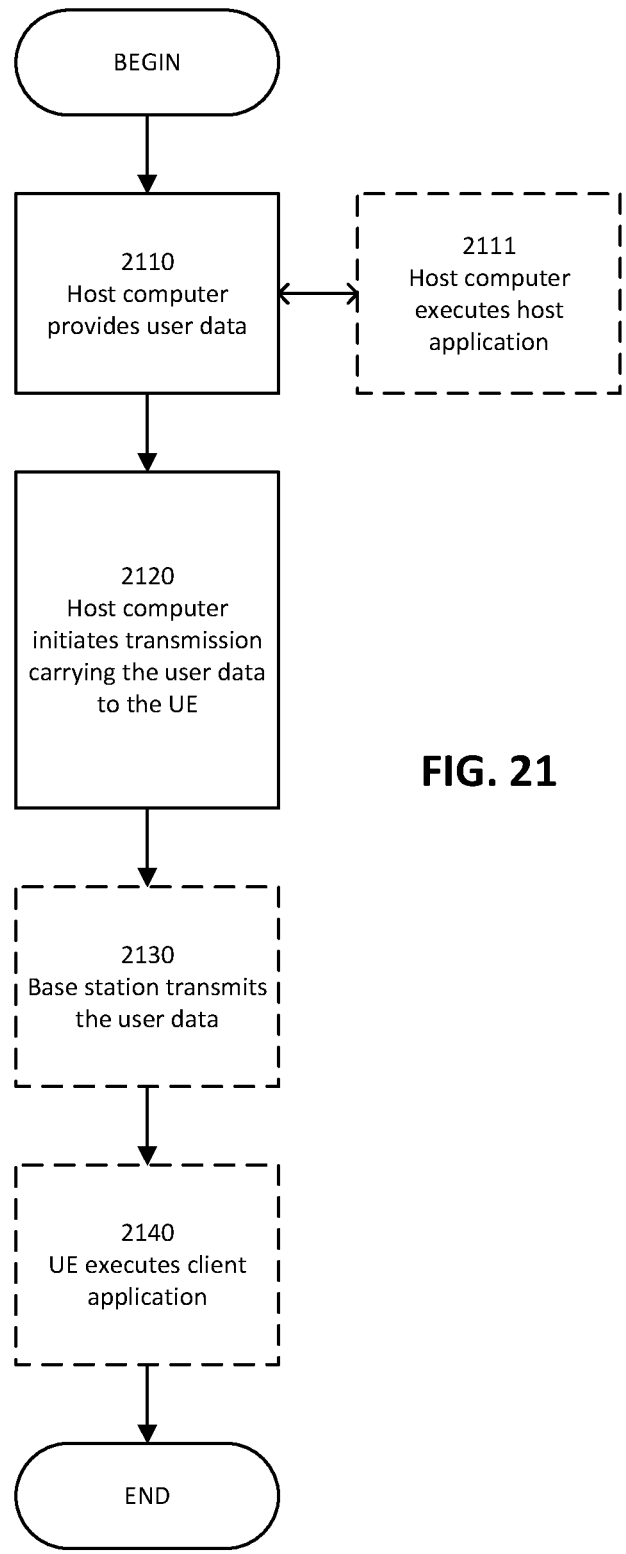
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
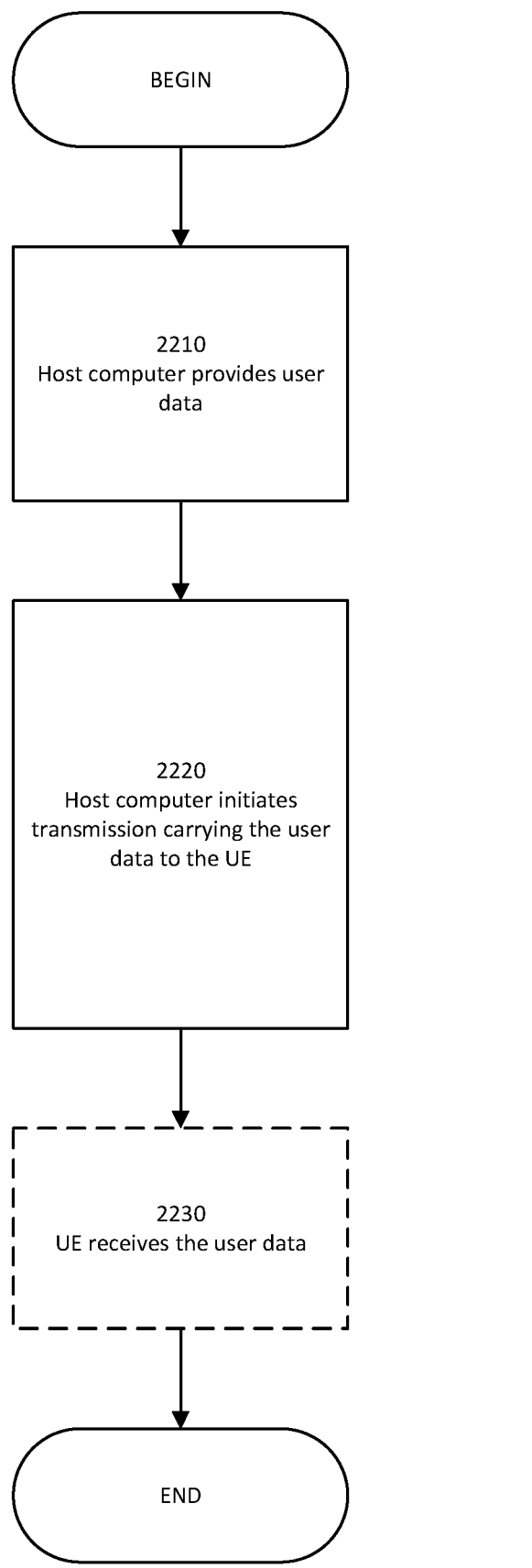
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
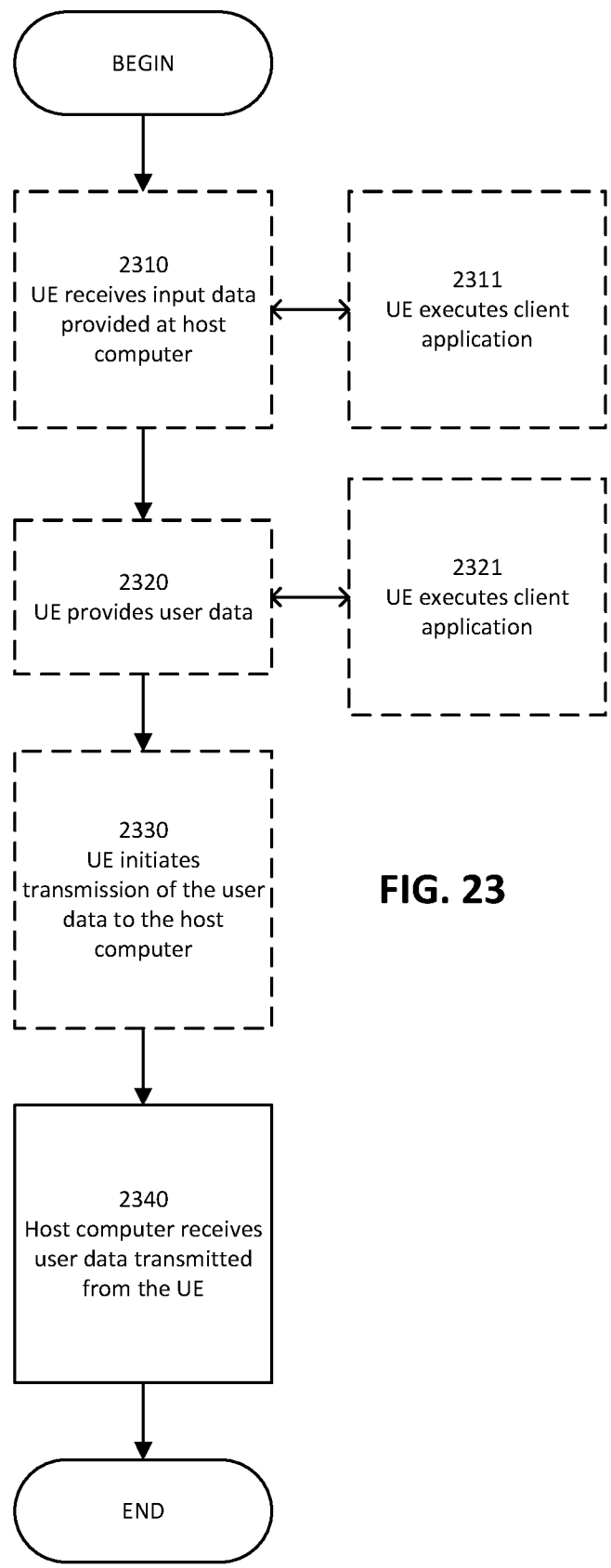
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
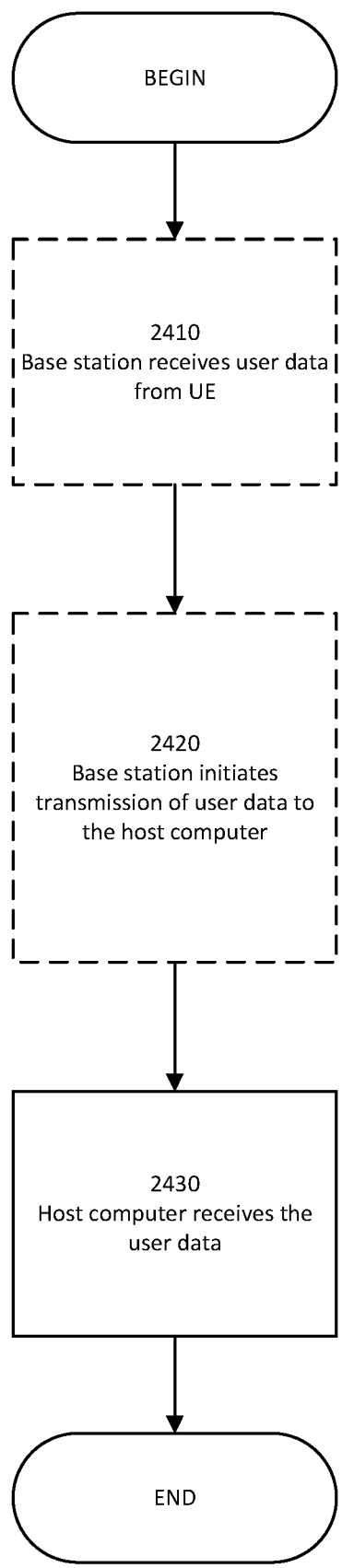
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1xRadio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method of operating a management node of a wireless mobile/cellular network including a Radio Access Network, RAN, having a plurality of RAN nodes and a transport network having a plurality of transport nodes, the method comprising:
   collecting network data for the wireless mobile/cellular network, wherein the network data include network installation data relating to the plurality of RAN nodes of the RAN and the plurality of transport nodes of the transport network;
   automatically providing a configuration for the wireless mobile/cellular network based on the network data; and
   responsive to providing the configuration, automatically deploying the configuration to provide configuration of the plurality of RAN nodes and the plurality of transport nodes.

2. The method of claim 1, wherein deploying the configuration comprises transmitting respective configuration parameters of the configuration to one or more of the RAN nodes and transport nodes.

3. The method of claim 1, wherein the plurality of RAN nodes includes radio nodes and baseband nodes.

4. The method of claim 3, wherein at least one of the baseband nodes comprises a baseband distributed unit, BB-DU, node and a baseband centralized unit, BB-CU, node.

5. The method of claim 4, wherein the BB-DU and the BB-CU are physically separated.

6. The method of claim 3, wherein an antenna is associated with at least one of the radio nodes, and wherein for the at least one of the radio nodes, the network installation data include at least one of a location of the antenna associated with the radio node, a height of the antenna associated with the radio node, a direction of the antenna associated with the radio node, and/or a tilt of the antenna associated with the radio node, and wherein the configuration is automatically provided based at least in part on at least one of the location of the antenna associated with the radio node, the height of the antenna associated with the radio node, the direction of the antenna associated with the radio node, and/or the tilt of the antenna associated with the radio node.

7. The method of claim 3, where the network installation data include respective identifications for the radio nodes, the baseband nodes, and the transport nodes, and wherein the configuration is automatically provided based at least in part on the respective identifications for the radio nodes, the baseband nodes, and the transport nodes.

8. The method of claim 3, wherein at least one of the radio nodes is coupled with an antenna via a cable and an antenna port of the radio node, wherein the network installation data include an identifier of the antenna and/or an identifier of the antenna port of the radio node, and wherein the configuration is automatically provided based at least in part on the identifier of the antenna and/or the identifier of the antenna port.

9. The method of claim 3, wherein at least one of the radio nodes is coupled with one of the transport nodes, wherein the network installation data include at least one of an identifier of a port of the transport node that is coupled with the radio node and/or an identifier of a port of the radio node that is coupled with the transport node, and wherein the configuration is automatically provided based at least in part on the identifier of a port of the transport node and/or the identifier of a port of the radio node.

10. The method of claim 1, wherein the network data further includes static global data including at least one of a Public Land Mobile Network, PLMN, identifier, ID, for the wireless mobile/cellular network, a radio spectrum allocation for the wireless mobile/cellular network, operator policies for the wireless mobile/cellular network, transport characteristic requirements for connections between the RAN nodes for the wireless mobile/cellular network, geographic definition of RAN areas for the wireless mobile/cellular network, and/or geographic definitions of transport areas for the wireless mobile/cellular network, and wherein the configuration is automatically provided based at least in part on the network installation data and based on the static global data.

11. The method of claim 1 further comprising:
automatically creating a topology of the wireless mobile/cellular network based on the network data, wherein the topology defines RAN areas, and wherein the configuration is automatically provided based at least in part on the RAN areas defined by the topology.

12. The method of claim 11 further comprising:
automatically creating a plurality of transport network areas of the wireless mobile/cellular network based on the topology, wherein at least one of the transport network areas includes a plurality of the RAN areas, and wherein the configuration is automatically provided based at least in part on the plurality of transport network areas;
automatically selecting global transport data for the wireless mobile/cellular network based on the plurality of transport areas, wherein the global transport data include at least one of interior gateway protocol, IGP, routing areas, Internet Protocol, IP addresses, and/or network node identifiers, and wherein the configuration is automatically provided based at least in part on the global transport data; and
automatically creating a transport configuration for the plurality of transport nodes based on the global transport data, wherein the configuration for the wireless mobile/cellular network includes the transport configuration and is automatically generated based at least in part on the transport configuration.

13. The method of claim 12, wherein the transport configuration includes IGP and border gateway protocol, BGP, routings for the wireless mobile/cellular network based on the global transport data including at least one of the IGP routing areas, IP addresses, and/or the node identifiers, and wherein the configuration for the wireless mobile/cellular network is automatically generated based at least in part on the transport configuration.

14. The method of claim 12 further comprising:
automatically calculating a connections possibility map for the wireless mobile/cellular network based on the transport configuration, wherein the connections possibility map defines possible RAN connections between the RAN and/or transport nodes, and wherein the configuration is automatically generated based at least in part on the connections possibility map;
automatically creating a RAN connections map based on the connections possibilities map, wherein the RAN connections map defines actual RAN connections between the RAN and/or transport nodes for the configuration, and wherein the configuration is automatically generated based at least in part on the RAN connections map;
automatically selecting RAN data based on the RAN connections map, wherein the RAN data include at least one of qNB/eNB identifiers, IDs, cell IDs, and/or tracking area IDs, and wherein the configuration is automatically generated based at least in part on the RAN data; and
automatically creating a RAN configuration for the plurality of RAN nodes based on the RAN data, wherein the configuration for the wireless mobile/cellular network includes the RAN configuration and is automatically generated based at least in part on the RAN configuration.

15. The method of claim 14, wherein the configuration for the wireless mobile/cellular network includes the RAN configuration and the transport configuration.

16. The method of claim 1 further comprising:
automatically creating a RAN connections map based on the network data, wherein the RAN connections map defines actual RAN connections between the RAN and/or transport nodes for the configuration, and wherein the configuration is automatically generated based at least in part on the RAN connections map;
automatically selecting RAN data based on the RAN connections map, wherein the RAN data include at least one of gNB/eNB identifiers, IDs, cell IDs, and/or tracking area IDs, and wherein the configuration is automatically generated based at least in part on the RAN data; and
automatically creating a RAN configuration for the plurality of RAN nodes based on the RAN data, wherein the configuration for the wireless mobile/cellular network includes the RAN configuration and is automatically generated based at least in part on the RAN configuration.

17. The method of claim 1 further comprising:
automatically creating a transport configuration for the plurality of transport nodes based on the network data, wherein the configuration for the wireless mobile/cellular network includes the transport configuration; and
automatically creating a RAN configuration for the plurality of RAN nodes based on the transport configuration and/or based on the network data, wherein the configuration for the wireless mobile/cellular network includes the RAN configuration.

18. The method of claim 1, wherein the configuration comprises a RAN configuration and a transport configuration, and wherein deploying the configuration comprises deploying the RAN configuration to the plurality of RAN nodes of the RAN and deploying the transport configuration to the plurality of transport nodes of the transport network.

19. A management node of a wireless mobile/cellular network including a Radio Access Network, RAN, having a plurality of RAN nodes and a transport network having a plurality of transport nodes, the management node comprising:
   processing circuitry; and
   memory coupled with the processing circuitry, wherein the memory includes instructions that when executed by the processing circuitry causes the management node node to,
      collect network data for the wireless mobile/cellular network, wherein the network data include network installation data relating to the plurality of RAN nodes of the RAN and the plurality of transport nodes of the transport network,
      automatically provide a configuration for the wireless mobile/cellular network based on the network data, and
      automatically deploy the configuration to provide configuration of the plurality of RAN nodes and the plurality of transport nodes responsive to providing the configuration.

20. A computer program product comprising a non-transitory storage medium including program code to be executed by processing circuitry of a management node of a wireless mobile/cellular network including a Radio Access Network, RAN, having a plurality of RAN nodes and a transport network having a plurality of transport nodes, whereby execution of the program code causes the management node to:
   collect network data for the wireless mobile/cellular network, wherein the network data include network installation data relating to the plurality of RAN nodes of the RAN and the plurality of transport nodes of the transport network;
   automatically provide a configuration for the wireless mobile/cellular network based on the network data; and
   automatically deploy the configuration to provide configuration of the plurality of RAN nodes and the plurality of transport nodes responsive to providing the configuration.

\* \* \* \* \*